(12) United States Patent
Aizawa et al.

(10) Patent No.: US 7,701,500 B2
(45) Date of Patent: Apr. 20, 2010

(54) ELECTRONIC CAMERA APPARATUS AND OPERATION GUIDE

(75) Inventors: Toyokazu Aizawa, Sagamihara (JP); Tatsuhiko Ikehata, Ome (JP); Kei Tashiro, Ome (JP); Hiroto Yoshihara, Ichikawa (JP); Takahisa Yoneyama, Yokohama (JP); Shiro Nagaoka, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 835 days.

(21) Appl. No.: 11/258,960

(22) Filed: Oct. 26, 2005

(65) Prior Publication Data

US 2006/0146167 A1    Jul. 6, 2006

(30) Foreign Application Priority Data

Jan. 5, 2005    (JP)    ............................. 2005-000842

(51) Int. Cl.
  *H04N 5/222* (2006.01)
  *H04N 5/76* (2006.01)

(52) U.S. Cl. ............................... 348/333.01; 348/231.2

(58) Field of Classification Search .............. 348/207.1, 348/231.1, 333.1, 231.2, 333.01
See application file for complete search history.

(56) References Cited

U.S. PATENT DOCUMENTS

| | | | | |
|---|---|---|---|---|
| 5,633,678 | A * | 5/1997 | Parulski et al. ............ | 348/231.5 |
| 7,319,490 | B2 * | 1/2008 | Kanamori et al. ........... | 348/375 |
| 7,515,190 | B2 * | 4/2009 | Kobayashi et al. ..... | 348/333.01 |
| 2002/0033848 | A1 | 3/2002 | Sciammarella et al. | |
| 2002/0149621 | A1 * | 10/2002 | Yamaguchi et al. ........ | 345/764 |
| 2002/0198006 | A1 * | 12/2002 | Hirayama et al. ........... | 455/456 |
| 2003/0038849 | A1 * | 2/2003 | Craven et al. ............... | 345/864 |
| 2004/0109063 | A1 * | 6/2004 | Kusaka et al. ............ | 348/207.1 |
| 2004/0164957 | A1 * | 8/2004 | Yamaguchi et al. ......... | 345/156 |
| 2004/0264810 | A1 * | 12/2004 | Taugher et al. .............. | 382/305 |
| 2005/0041035 | A1 * | 2/2005 | Nagatomo et al. .......... | 345/601 |
| 2005/0081164 | A1 * | 4/2005 | Hama et al. ................. | 715/830 |
| 2005/0212915 | A1 * | 9/2005 | Karasaki et al. .......... | 348/207.2 |

FOREIGN PATENT DOCUMENTS

| | | |
|---|---|---|
| JP | 2001160937 | 6/2001 |
| JP | 2001-306375 | 11/2001 |

(Continued)

OTHER PUBLICATIONS

Korean Office Action dated Nov. 20, 2006 re Application 10-2005-0101805 entitled Electronic Camera Apparatus and Operation Guide and English translation.

(Continued)

*Primary Examiner*—Nhan T Tran
*Assistant Examiner*—Trung Diep
(74) *Attorney, Agent, or Firm*—Blakely, Sokoloff, Taylor & Zafman LLP

(57) ABSTRACT

A concept such as an album is introduced with respect to management and arrangement of image files, and several albums are electronically classified and managed for an electronic camera apparatus. According to one embodiment, a method comprises capturing an image, recording the image as an image file, creating a plurality of albums used for classifying and arranging the image file, and displaying album identifier information corresponding to each of the created plurality of albums during the shooting mode or the playback mode.

20 Claims, 23 Drawing Sheets

FOREIGN PATENT DOCUMENTS

| | | |
|---|---|---|
| JP | 2002-135709 | 5/2002 |
| JP | 2002-199334 | 7/2002 |
| JP | 2003-084903 | 3/2003 |
| JP | 2004-013505 | 1/2004 |
| JP | 2004-208012 | 7/2004 |
| JP | 2004-208122 | 7/2004 |
| KR | 20030059578 | 7/2003 |

OTHER PUBLICATIONS

Japanese Patent Application No. 2005-000842, Notice of Reasons for Rejection, maield Dec. 1, 2009 (English translation).

* cited by examiner

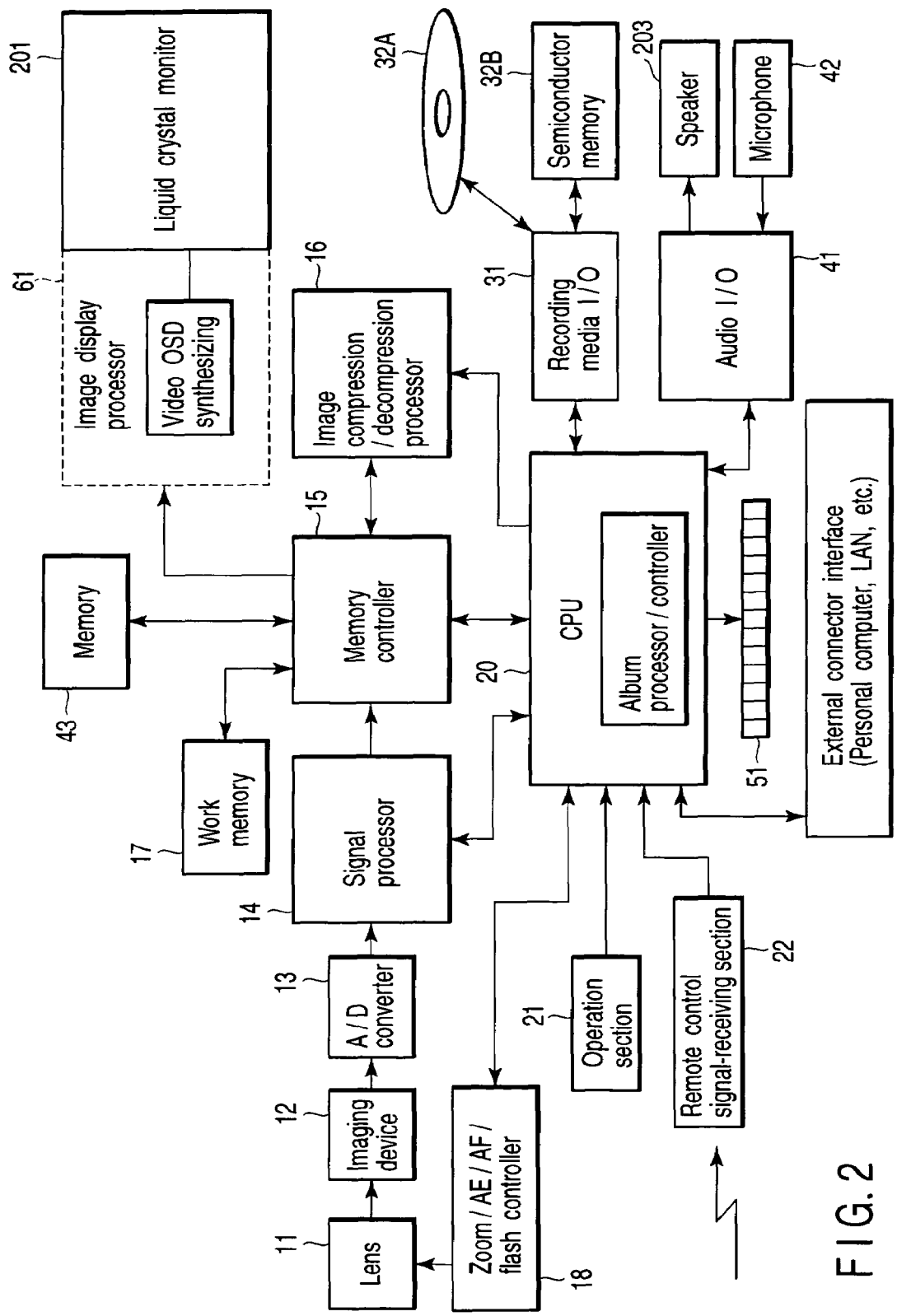
F I G. 2

FIG. 3

| No. | Icons | English name | Japanese name | No. | Icons | English name | Japanese name | No. | Icons | English name | Japanese name |
|---|---|---|---|---|---|---|---|---|---|---|---|
| 1 | 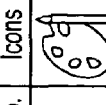 | Art | アート | 12 | 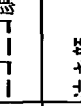 | Business | ビジネス | 23 |  | Pet | ペット |
| 2 |  | Mail | メール | 13 | 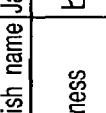 | Memo | メモ | 24 | 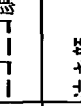 | Spring | 春 |
| 3 | 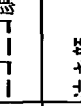 | Gift | 宝箱 | 14 |  | PC | PC | 25 | 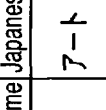 | Summer | 夏 |
| 4 | 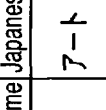 | Trash | ゴミ箱 | 15 | 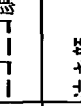 | Birthday | 誕生日 | 26 |  | Autumn | 秋 |
| 5 |  | Drive | ドライブ | 16 | 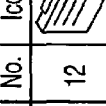 | Wedding | 結婚式 | 27 | 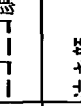 | Winter | 冬 |
| 6 | 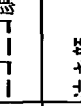 | Party | パーティー | 17 |  | Ceremony | 入学式 | 28 |  | Happy | ニコニコ顔 |
| 7 |  | Travel | 旅行 | 18 | 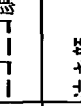 | Baby | 赤ちゃん | 29 |  | Sad | 泣き顔 |
| 8 |  | Music | 音楽 | 19 |  | Kids | 子供 | 30 | 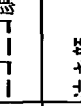 | Love | ハート |
| 9 | 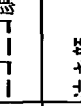 | Sports | スポーツ | 20 |  | Family 1 | 父母 | 31 | 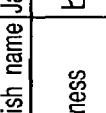 | Lucky | Vサイン |
| 10 | 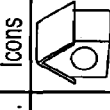 | Beach | 海 | 21 | 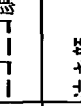 | Family 2 | じじばば | 32 |  | Calendar | カレンダー |
| 11 |  | Landscape | 山 | 22 | 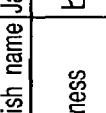 | Family 3 | 家族 | | | | |

(Note: These Japanese words are used as "symbols" for the sake of explanation)

● Button operation when shooting menu is set

| Button \ Operation | Menu display mode | Item select mode |
|---|---|---|
| ▲ | Select menu item | Select item |
| ▼ | Select menu item | Select item |
| ▶ | Enter selected menu or item | |
| ◀ | — | Return to preceding screen |
| Rotate jog dial to the right | Select menu item | Select item |
| Rotate jog dial to the left | Select menu item | Select item |
| OK | Enter selected menu or item | |
| MENU | Return to shooting mode | Return to menu |

FIG. 5A

● Shooting menu

| Menu name | Outline |
|---|---|
| Self timer | Set self-timer |
| Digital zoom | Set magnification of digital zoom and on / off thereof |
| Video quality | Set video quality |
| Still image size | Set still image shooting size |
| Still image quality | Set still image quality |
| ISO sensitivity | Set sensitivity in still image shooting mode |
| White balance | Set white balance |
| Color | Set image color tone |
| Contrast | Set difference between brightness and darkness of image |
| Sharpness | Set image touch |
| Metering system | Set metering system to calculate exposure |
| AF focusing point | Set focused area |
| Preview | Set preview on / off after still image is shot |
| Wind noise reduction | Set wind noise reduction on / off |
| Camera shake correction | Set camera shake correction on / off |
| Continuous shooting | Set continuous shooting |
| Album select | Select and create album |
| Brightness of liquid crystal | Set brightness of liquid crystal |
| Erase (Delete) | Erase (Delete) image |
| Setup | Display setup menu |

FIG. 5B

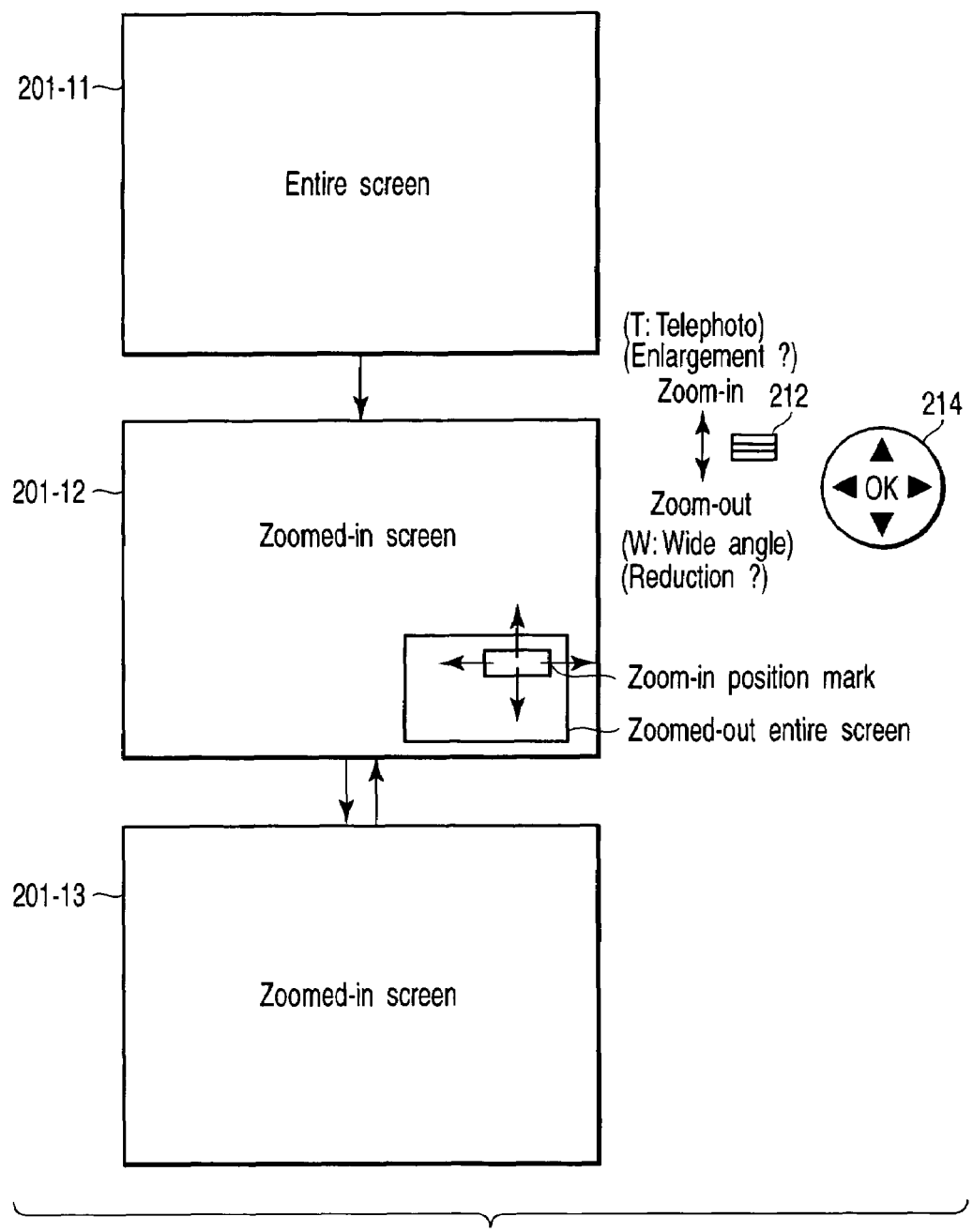
F I G. 14

ELECTRONIC CAMERA APPARATUS AND OPERATION GUIDE

CROSS-REFERENCE TO RELATED APPLICATIONS

This application is based upon and claims the benefit of priority from prior Japanese Patent Application No. 2005-000842, filed Jan. 5, 2005, the entire contents of which are incorporated herein by reference.

BACKGROUND

1. Field

Embodiments of the present invention relate to an electronic camera apparatus and operation guide method therefor. In particular, the present invention is effective for an electronic camera apparatus, configured with a removable mass-capacity recording medium.

2. Description of the Related Art

Generally, an electronic camera apparatus is loadable with a recording medium, such as semiconductor memory. Picked-up (captured) image data is stored in the semiconductor memory. When the user operates the electronic camera apparatus, the image data stored in the semiconductor memory is read, and thereafter, displayed on a liquid crystal display monitor on the electronic camera.

In the conventional electronic camera apparatus, the picked-up image data is stored with a given file number (e.g., see JPN. PAT. APPLN. KOKAI Publication No. 2002-199334).

In recent years, the storage capacity of semiconductor memories has increased; therefore, a great many image files can be stored. Moreover, the function in which the electronic camera apparatus is connected to a personal computer to display image data on the personal computer has been developed. However, an effective arrangement and management method of the image files has not been developed as yet.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is an exemplary block diagram to explain the configuration of optical system and electric circuit system of the electronic camera apparatus shown in FIG. 1A and FIG. 1B;

FIG. 3 is an exemplary view showing album icon samples previously stored in a memory of FIG. 1 in the electronic camera apparatus according to one embodiment of the invention;

FIG. 5A is an exemplary table to explain button operation contents operated by a shooting menu in the electronic camera apparatus;

FIG. 5B is an exemplary table to explain various menu contents selected by the shooting menu;

FIG. 14 is a view to explain the exemplary screen when zoom-in and zoom-out displays are made in a still image playback mode of the electronic camera apparatus;

DETAILED DESCRIPTION

Embodiments of the invention will be described below with reference to the accompanying drawings.

Figure 1A:
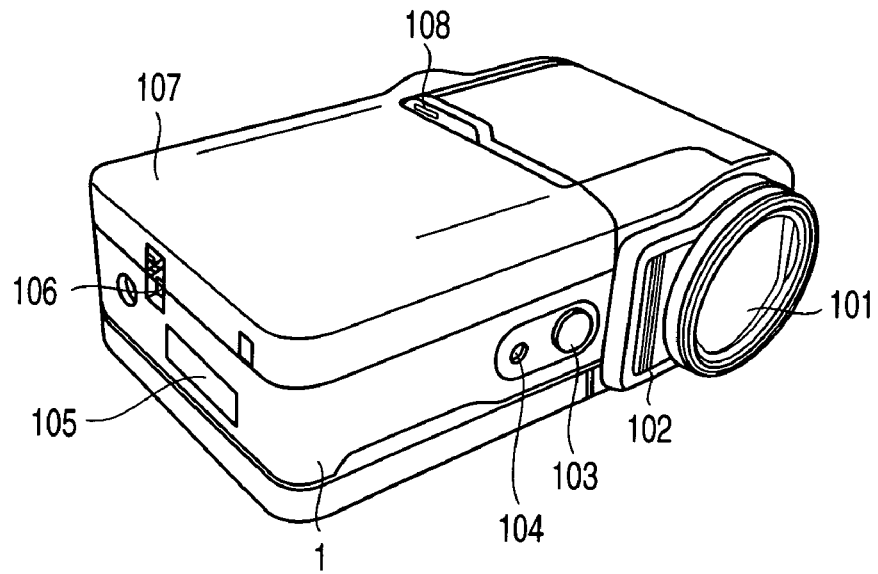
FIG. 1A and FIG. 1B are exemplary perspective views to schematically explain the appearance of an electronic camera apparatus according to the present invention.
Figure 1B:
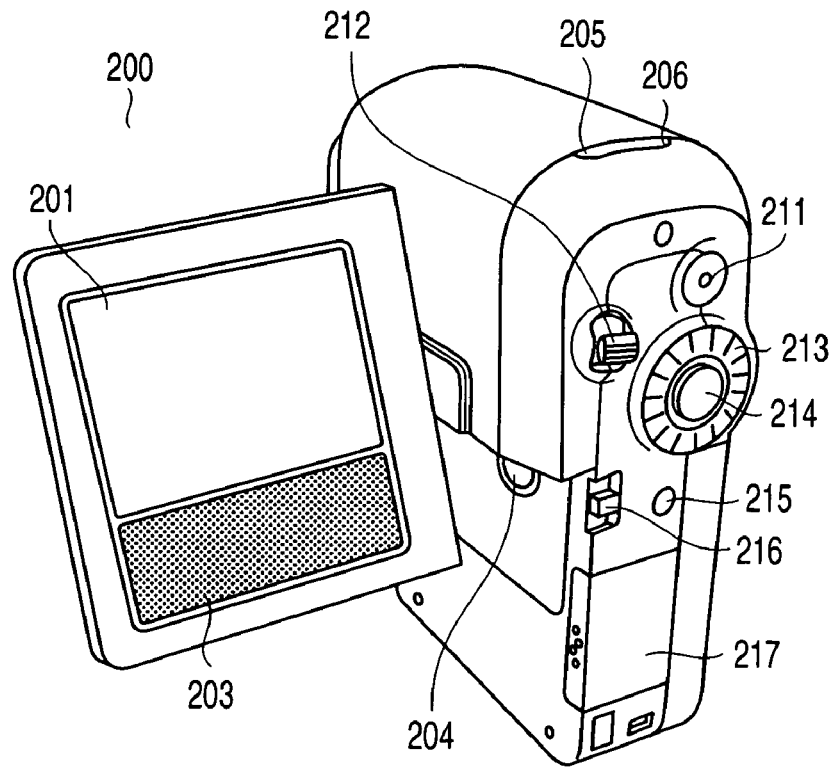

FIG. 1A and FIG. 1B schematically show the appearance of an electronic camera apparatus to which one embodiment of the invention is applied. FIG. 1A is a perspective view of the front side of the electronic camera apparatus from below. In FIG. 1A, the electronic camera comprises an imaging (image pickup) lens 101, a (built-in) flash 102, a shutter button 103, and a remote control signal-receiving port 104. An adapter connection terminal 105 is used when the electronic camera apparatus is connected to a personal computer, power source, etc. Other features according to this embodiment include, but are not limited or restricted to a tripod tap hole 106, a battery cover 107, and a strap attachment eyelet 108.

FIG. 1B is a perspective view of the rear side of the electronic camera apparatus from the left side. As shown, the electronic camera apparatus comprises a liquid crystal monitor 201 and a speaker 203. These liquid crystal monitor 201 and speaker 203 are built in an integrated flat-shaped frame 200. The frame 200 is usually received in a recess of the main body of the electronic camera apparatus. When the electronic camera apparatus is used, the frame 200 is opened as shown in FIG. 1B. A numeral 204 denotes a power button for turning on and off power, 205 denotes a status LED, and 206 denotes a media LED. The illumination color of the status LED 205 changes in accordance with a shooting mode or playback mode. Likewise, the illumination color of the media LED 206 changes in accordance with the currently used media (hard disk or semiconductor memory).

A reference numeral 211 denotes a movie-recording button, which is operated when making moving image (video) recording. A numeral 212 denotes a zoom bar, which is used for zoom control. A numeral 213 denotes a jog dial, which is used for selecting various functions, and the function selected by pressing an OK button 214 is defined. Operation content and status of the jog dial 213 is displayed on the liquid crystal monitor 201. A numeral 215 denotes a menu button, which is used for displaying various menus on the monitor. A numeral 216 denotes a mode lever, and 217 denotes a cover of a slot receiving a removable semiconductor memory.

FIG. 2 is a block diagram to explain the configuration of the optical system and electric circuit system of the electronic camera apparatus. A subject image captured from a lens 11 is imaged on an image plane of an imaging device 12 (e.g., CCD image sensor). The subject image is converted into an electric signal therein, and thereafter, converted into a digital signal via an analog/digital (A/D) converter 13, and then, inputted to a signal processor 14. The signal processor 14 carries out gamma correction, color signal separation and white balance control. The foregoing imaging device 12, A/D converter 13 and signal processor 14 function as an imaging section.

If a shutter operation is not made in a normal shooting status (mode), video data from the signal processor 14 is inputted to an image display processor 61 via a memory controller 15. In this case, conversion and menu synthesizing are carried out to display the shot image on the liquid crystal monitor 201. The image data from the image display processor 61 is supplied to the liquid crystal monitor 201. By doing so, a shooting image or aimed subject image in a standby state is displayed on the liquid crystal monitor 201.

When the shutter operation is made, the picked-up image data is compressed (e.g., compression confirmable to JPEG) in an image compression/decompression processor 16. Thereafter, the image data is stored in a hard disk 32A or semiconductor memory (e.g., SD card) 32B via a recording media interface 31 under the control of a CPU (central processing unit) 20. The recording media is not limited to above, and an optical disk may be used.

When image data stored in the recording media is read, the image data is decompressed in the image compression/decompression processor 16 under the control of the CPU 20. Thereafter, the image data is inputted to the image display processor 61 via the memory controller 15. By doing so, a playback (reproduction) image is displayed on the liquid crystal monitor 201.

A work memory 17 is used to edit image data, to create thumbnail image and to make replacement of the image order. In addition, the work memory 17 is used to edit various icons. The work memory 17 is able to save (store) image data equivalent to one or more screens. The image data saved in the work memory 17 is inputted to the image display processor 61 via the memory controller 15. Therefore, it is possible to confirm image editing.

In editing or shooting, audio data is captured via a microphone 42 and audio interface 41. The audio data is paired with the shot image data, and thereafter, is recorded to recording media. If the user desires to reproduce the recorded audio data, it is read from the recording media together with the shot image data. The audio data is output as sound from a speaker 203 via the audio interface 41 while playing back an image. In this case, according to the present invention, it is possible to mute the sound when during playback and confirm the image.

In a shooting mode, the CPU 20 carries out zoom control, auto-exposure (iris) control (AE), auto-focus control (AF) and flash control in accordance with a control signal via a controller 18. An external operation signal is given to the CPU 20 via operation tools 21 and a remote control signal-receiving part. Moreover, the CPU 20 is connected with an external connection interface (not shown); therefore, the camera is connectable with an external display device such as a TV. Here, the foregoing operation tools 21 are shown collectively calling various operation buttons shown in FIG. 1.

The CPU 20 controls the status LED 205 as a status display device. The status display device is able to make color display. The display pattern and the kind of display color are combined, thereby giving various informations to the user, who is situated in front of the camera main body. For example, six colors may be displayed. Various kinds, slow, quick, continuous and intermittent flashing are given as the display pattern. The foregoing display pattern is combined with the kind of color.

The user can arbitrarily set and customize the combination of the display pattern and the kind of display color.

The following is an explanation about a typical configuration and method in the electronic camera apparatus of the present invention.

[Album Identifier Information]

Here, album identifier information is information for identifying the kind of album. The album identifier information is composed of an icon, mark, symbol, graphic, character, or combination of those. In the following, icons are used.

FIG. 3 shows a number of album icons. (Note: Japanese words in FIG. 3 are used as "Symbols" for sake of explanation.) Album icons 1 to 32 may be previously provided with English and Japanese album names. This album is previously stored in memory 43 of FIG. 2 to create an album, and does not have a function as the album icon in the initial stage. As described later, when an icon is selected to create an album, the selected icon functions as an album icon.

In the electronic camera apparatus of the present invention, the mode lever 216 of FIG. 1B is operated, and thereby, shooting mode and playback mode are changeable. In the shooting mode, when the user operates the menu button 215, a shooting menu is displayed on the liquid crystal monitor 201. The shooting menu offers various items when the jog dial 213 is operated.

Figure 4:
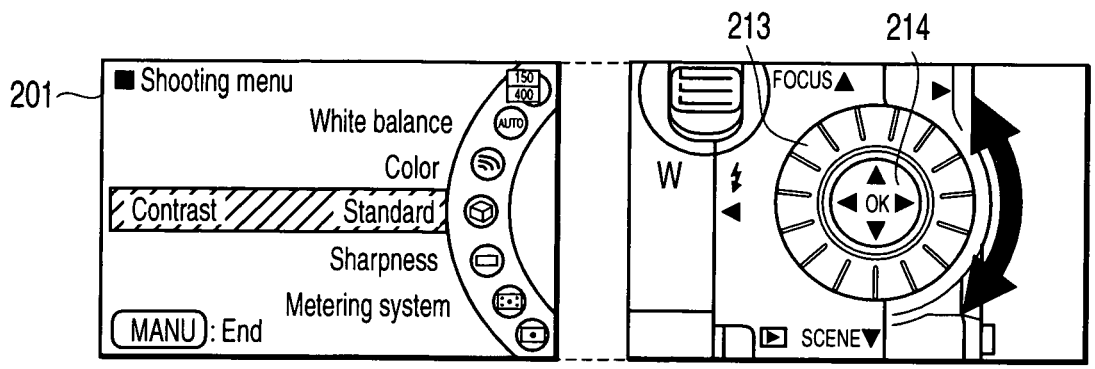
FIG. 4 is an exemplary view to explain the positional relationship between a jog dial/OK button and a liquid crystal monitor screen in an exemplary electronic camera apparatus.

FIG. 4 shows a state that the shooting menu is displayed on the liquid crystal monitor 201. The jog dial 213 and the liquid crystal monitor 201 are arranged adjacent to each other. On the liquid crystal monitor 201, part of the arc of the jog dial 213 is in a displayed state. The jog dial 213 is rotated, and thereby, various menu items of the shooting menu are successively scrolled on the screen. Menu items are scrolled, as indicated with a cursor, and then, selected.

When a desired menu item is selected, the user presses the OK button 214, and thereby, a screen for setting the details of the selected menu item appears.

FIG. 5A shows the function of buttons used when setting various shooting conditions using the shooting menu. FIG. 5B shows menu item names and setting contents. The apparatus of the present invention has a menu item of "Album Select".

Figure 6A:
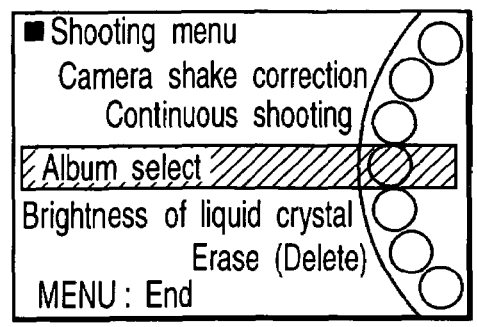
FIG. 6A to FIG. 6E are exemplary views showing a monitor screen to explain a function when album select is made using the shooting menu of the electronic camera apparatus.
Figure 6B:
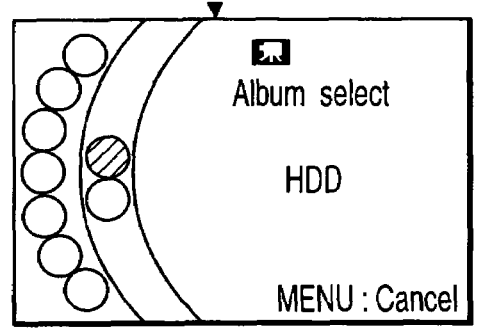

FIG. 6A shows a state that a menu item "Album select" is selected. When the user presses the OK button 214, an inquiry as to which hard disk (HDD) or SD card is selected as a recording media is given to the user, as shown in FIG. 6B. The user presses the upward or downward triangular arrow of the OK button 214, and thereby, HDD or SD card is selected with a cursor. If the user selects the HDD with the cursor, an indicator "HDD" is displayed on the liquid crystal monitor 201. If the user selects the SD card with the cursor, an indicator "SD card" is displayed on the liquid crystal monitor 201. FIG. 6B shows a state that "HDD" is selected.

Figure 6C:
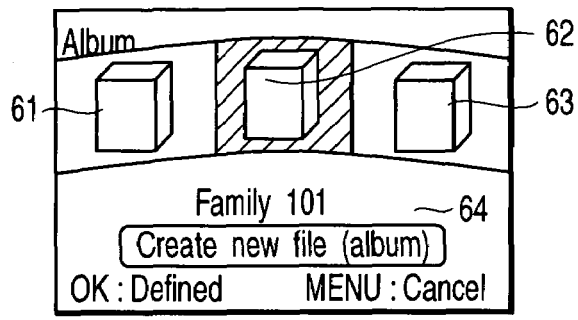

In this case, if several albums already exist in the hard disk, album icons 61, 62 and 63 appear with the rotating operation of the jog dial 214 as seen from FIG. 6C. FIG. 6C shows that the album corresponding to the album icon 62 on the center position is selectable. Simultaneously, an album name 64 with respect to the selectable album is displayed.

When the user presses the OK button 214 to select the album corresponding to the album icon 62, imaging data is associated with the album. In FIG. 6C, although shown like a simple box, the album may appear as an icon image shown in FIG. 3 in fact.

Now, FIG. 6C shows a state that the album "family 101" is selected. However, the following case should be considered. Namely, in the family, the son desires to create a second album "family" for images shot by himself, in addition to the first album "family 101" shot by the father.

Figure 6D:
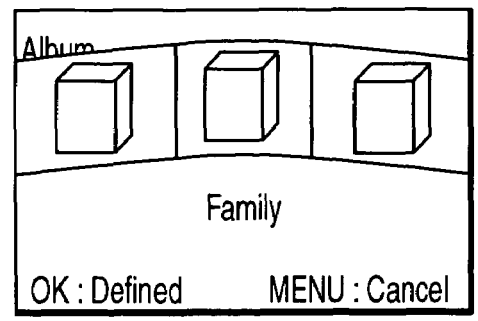

In such a case, the son presses the downward triangular arrow of the OK button 214, thereby selecting a menu item "create new file". When the OK button 214 of FIG. 1B is pressed in a state that the menu item "create new file" is selected, a new album is created as illustrated in FIG. 6D. In this case, the second album is set as "family 102". Therefore, the foregoing first and second albums are distinguishable from each other.

Figure 6E:
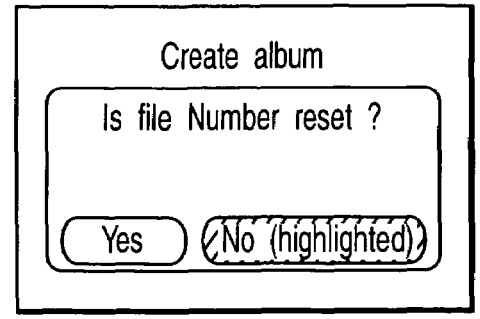

Then, as shown in FIG. 6E, when the OK button 214 is again pressed, an inquiry as to whether the image file number stored in the album is reset is given. This results from the following reasons. First, if the second album continuing the first album as family is created, it is desirable to continue the image file number. Secondary, if the first and second albums are used independently from each other, it is recommended to start each image file from the initial value.

In either case, the user presses the upward or downward triangular arrow of the OK button 214, thereby, selecting which "YES" or "NO".

In the state shown in FIG. 6C, when the user further rotates the jog dial 213, icons shown in FIG. 3 appear in succession. Thus, the user selects an arbitrary icon to create a new album.

In the shooting mode, if the user shoots without designating a specified album or newly creasing an album, the shot image file is automatically stored in the album of the icon "Calendar" shown in FIG. 3.

[Monitoring]

As described above, the electronic camera apparatus is able to set the foregoing album. Therefore, it is possible to display which picked-up still image or video image is stored in an album on the monitor screen.

Figure 7:
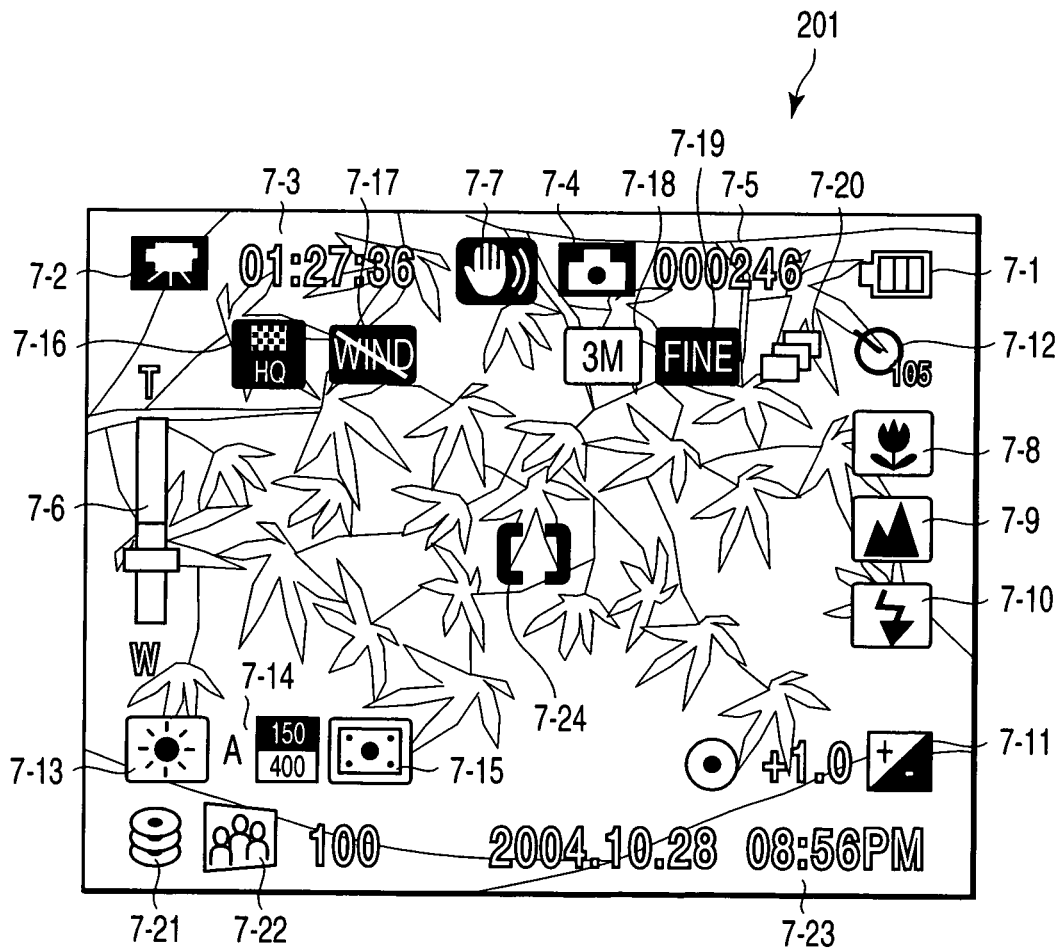
FIG. 7 is an exemplary view showing various icons appearing on the monitor screen of the electronic camera apparatus.

In FIG. 7, there are shown various icons displayable on the liquid crystal monitor 201 in the shooting mode. In FIG. 7, an icon 7-21 shown at the lower left indicates which media image data shot after this is recorded. According to the icon 7-21, the image data is stored in the hard disk. Moreover, an icon 7-22 indicates which album the image data is stored in. The icon 7-22 is the family album, and a folder number "100" is shown at the right side of the icon 7-22.

The following is an explanation about other icons. 7-1 is an icon indicating a battery residual level, and 7-2 is a video mark, that is, video shooting icon (disappearing in half shutter mode). 7-3 is an icon indicating shoot-able time (disappearing in half shutter), and 7-4 is a still image mark, that is, still image shooting icon indicated exclusive of the video image shooting. 7-5 is an icon indicating the number of shoot-able photographs, and 7-6 is an icon indicating the state of the zoom. 7-7 is a camera shake warning icon, and displayed as warning when the shutter speed for a still image is too slow. The icon 7-7 is not displayed in the video shooting mode. An icon 7-8 is a focus reference mark, and is not displayed in auto-focus mode. An icon 7-9 is a scene mark, and displayed excluding auto-mode. An icon 7-10 indicates a flash, and changes into yellow in half shutter mode if it flashes. 7-11 is an exposure correction icon, and 7-12 is a self-timer icon.

7-13 is a white balance icon, 7-14 is a sensitivity icon, and 7-15 is a metering system icon. Moreover, 7-16 is an icon indicating video image quality, 7-17 is a wind noise reduction icon, and 7-18 is a still image size icon. 7-19 is an icon indicating still image quality, and 7-20 is a continuous shooting icon. 7-21 is an icon indicating media described before, and 7-22 is an album icon. 7-23 is an icon indicating date/time. 7-24 is a focus area icon.

[Detail and Normal Indications of Shooting Condition]

The electronic camera apparatus of the present invention is able to make a changeover of normal and detail indications when displaying icons on the liquid crystal monitor. According to the normal indication, the minimum icons necessary for shooting are displayed. On the other hand, according to the detail indication, various setting conditions are additionally displayed. For example, the detail indication is displayed for three seconds when the shooting condition is variously set and when the screen is returned to a monitoring screen after any setting is changed using the menu.

Figure 8A:
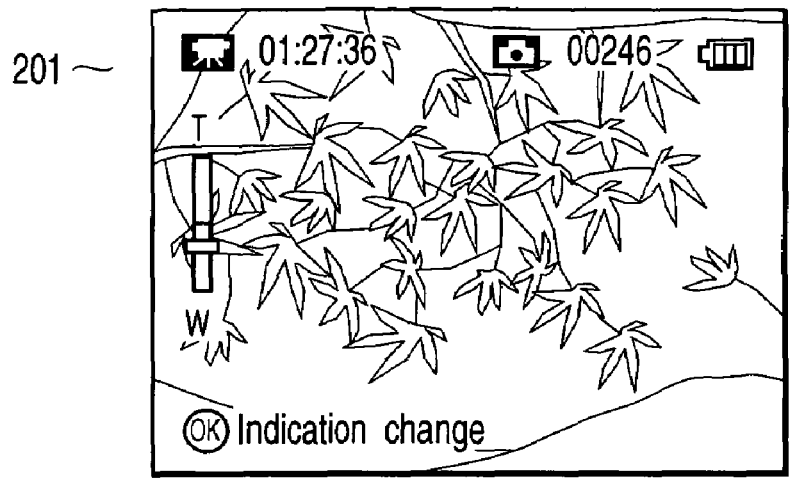
FIG. 8A is an exemplary view showing normal indicators of various information representing shooting conditions in a shooting mode of the electronic camera apparatus.
Figure 8B:
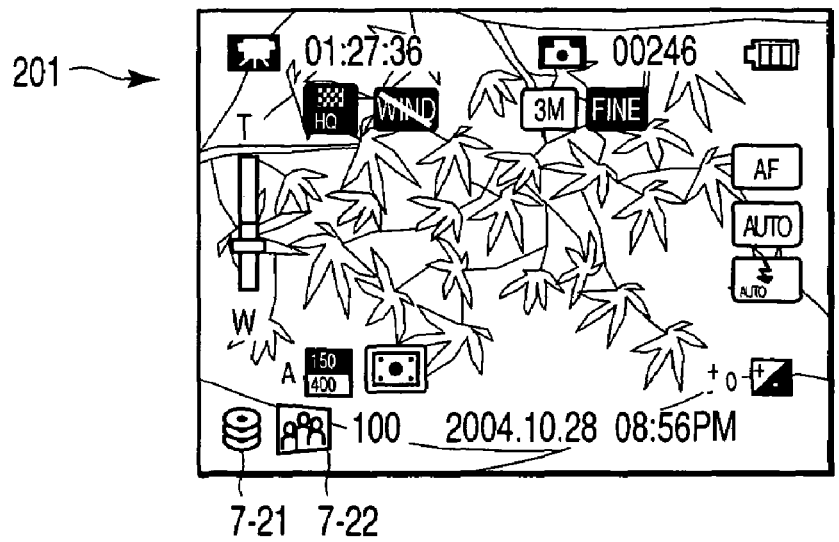
FIG. 8B is a view showing detail indicators thereof.

As seen from FIG. 8A and FIG. 8B, an indication "OK indication change" is given in the normal indication mode. The user operates the OK button, thereby changing the indication mode from the normal indication to the detail indication. In the normal indication mode, the necessary minimum icons are displayed; therefore, the user readily monitors the picked-up image. In the detail indication mode, the user can confirm the contents of changed setting. In addition, in the detail indication mode, various setting items are displayed. In FIG. 8B, the recording medium icon 7-21 (e.g., hard disk) and the album icon 7-22 (e.g., album "family") are displayed.

[Pause in Video Shooting Mode]

The electronic camera apparatus of the present invention has a pause function in the video shooting mode. In this case, recording data is managed as the end of a video file (or chapter) at paused scene. Therefore, a pause button is operated in the video shooting mode, and thereby, video files are successively created.

Figure 9A:
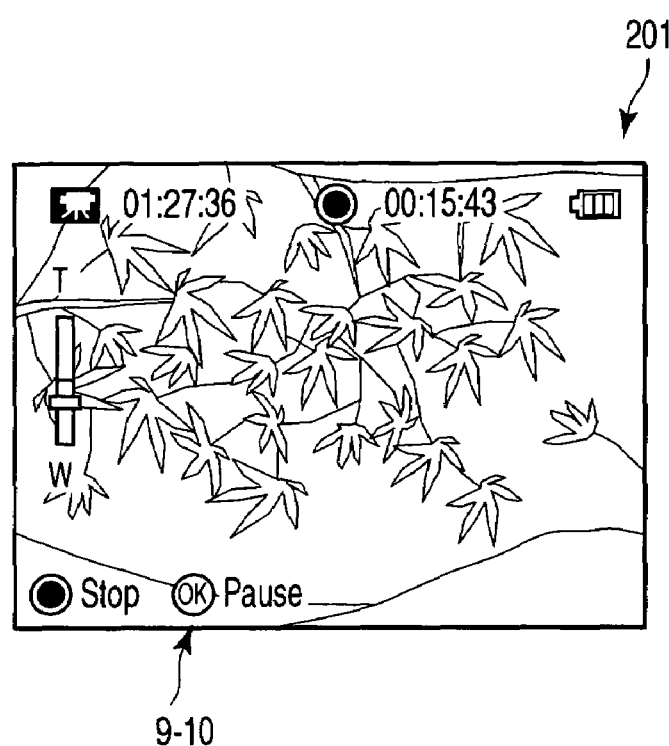
FIG. 9A and FIG. 9B are views showing an exemplary screen when a pause mark is displayed in a video shooting mode of the electronic camera apparatus.
Figure 9B:
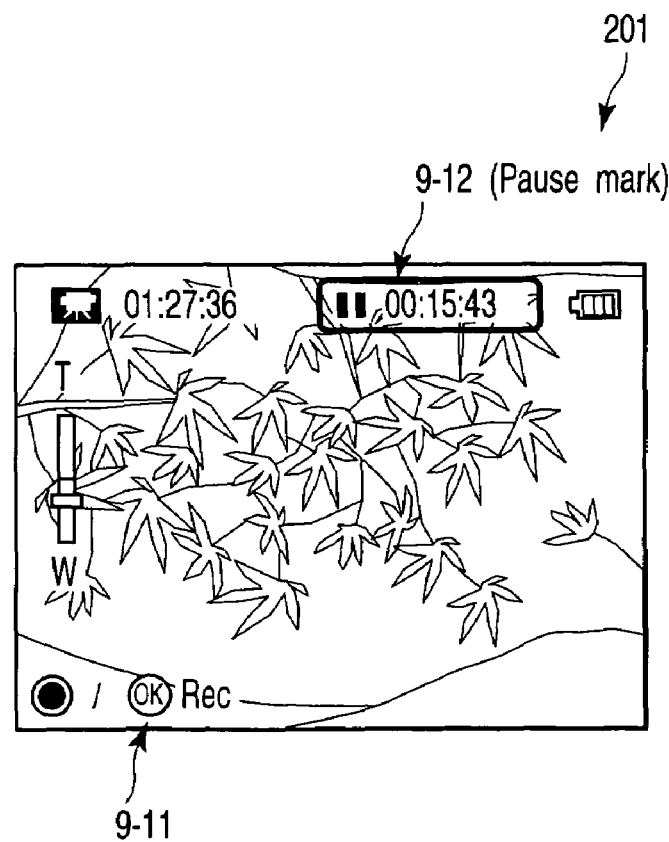

Explanation will be given below with reference to FIG. 9A and FIG. 9B. FIG. 9A shows a display screen on the liquid crystal monitor 201 in the video shooting mode. When the OK button 214 is operated, the display screen is shifted to a paused state, that is, a screen shown in FIG. 9B. Then, the OK button 214 is again operated from the screen state shown in FIG. 9B, thereby returning to the video shooting mode. The user understands individual function descriptions of icons 9-10 and 9-11 shown in FIG. 9A and FIG. 9B to obtain the foregoing operation. In the pause mode, an icon 9-12 as a pause mark is displayed as seen from FIG. 9B.

[Display in Combination with Key (e.g., Jog Dial) to be Operated and Icon Indicating Operation Content]

Figure 10:
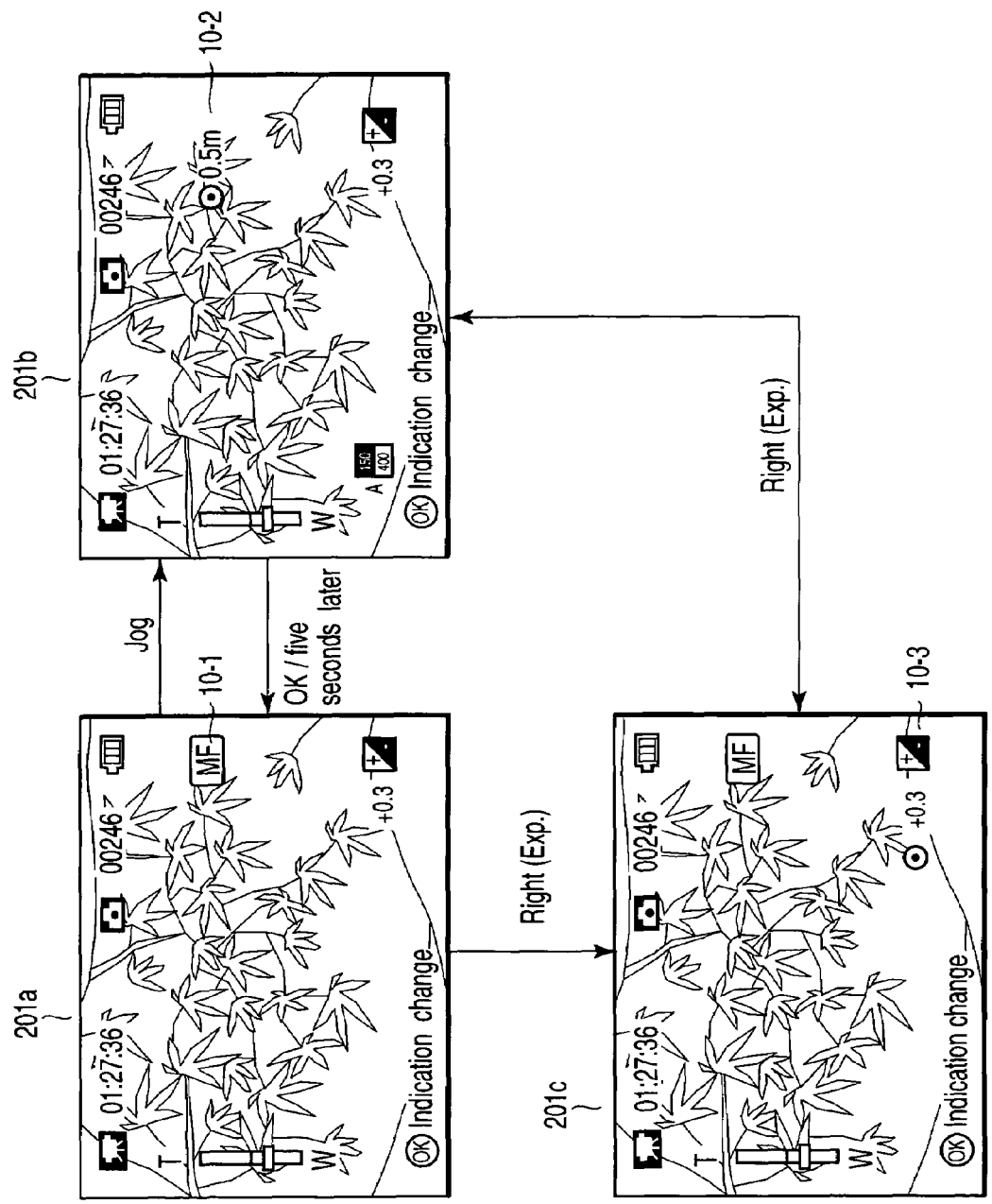
FIG. 10 is an exemplary view showing a guide screen displaying a mark of a key (e.g., jog dial) to be operated on the side of a displayed adjust value when a shooting condition of the electronic camera apparatus is set.

The electronic camera apparatus makes exposure correction and manual focus; in this case, operation icons for control are concurrently displayed together with their control values. Namely, a display screen shown in FIG. 10 is obtained.

The user rotates the jog dial 214 in a menu mode, and thereby, a manual focus item appears. Here, the user presses the OK button, and thereby making manual focus control. In this case, when the user rotates the jog dial, icons displayed on a guide screen 201a are changed into an icon display state shown in a guide screen 201b. In the guide screen 201b, a jog dial mark and a control value are displayed. Here, the user rotates the jog dial 214, thereby adjusting focus.

When the user presses the right triangular arrow of the OK button 214 from the display state of the guide screen 201b, the screen is shifted to a guide screen 201c for adjusting exposure. In this state, the jog dial 213 is rotated to adjust the exposure. In this case, a jog dial mark appears on the left side of an exposure control icon 10-3.

If the user desires to shift the screen from the guide screen 201a to the guide screen 201c for adjusting exposure, the user presses the right triangular arrow of the OK button 214 to achieve the foregoing shift. When the user presses the OK button 214 from the state of the guide screen 201c, the screen is returned to the shooting mode screen after five seconds.

As described above, the jog dial mark is indicated on the side the icon, and thereby, the electronic camera apparatus is able to visually guide operation tools to be operated by the user. In FIG. 10, the jog dial mark is shown; in this case, other key marks may be used.

[Display Shooting Mode Icons Affected by the Result when Setting Shooting Conditions]

When the shooting conditions are set, the electronic camera apparatus is able to show icon that indicates the setting result of conditions giving its influence to which video shooting mode or still image shooting mode.

Figure 11:
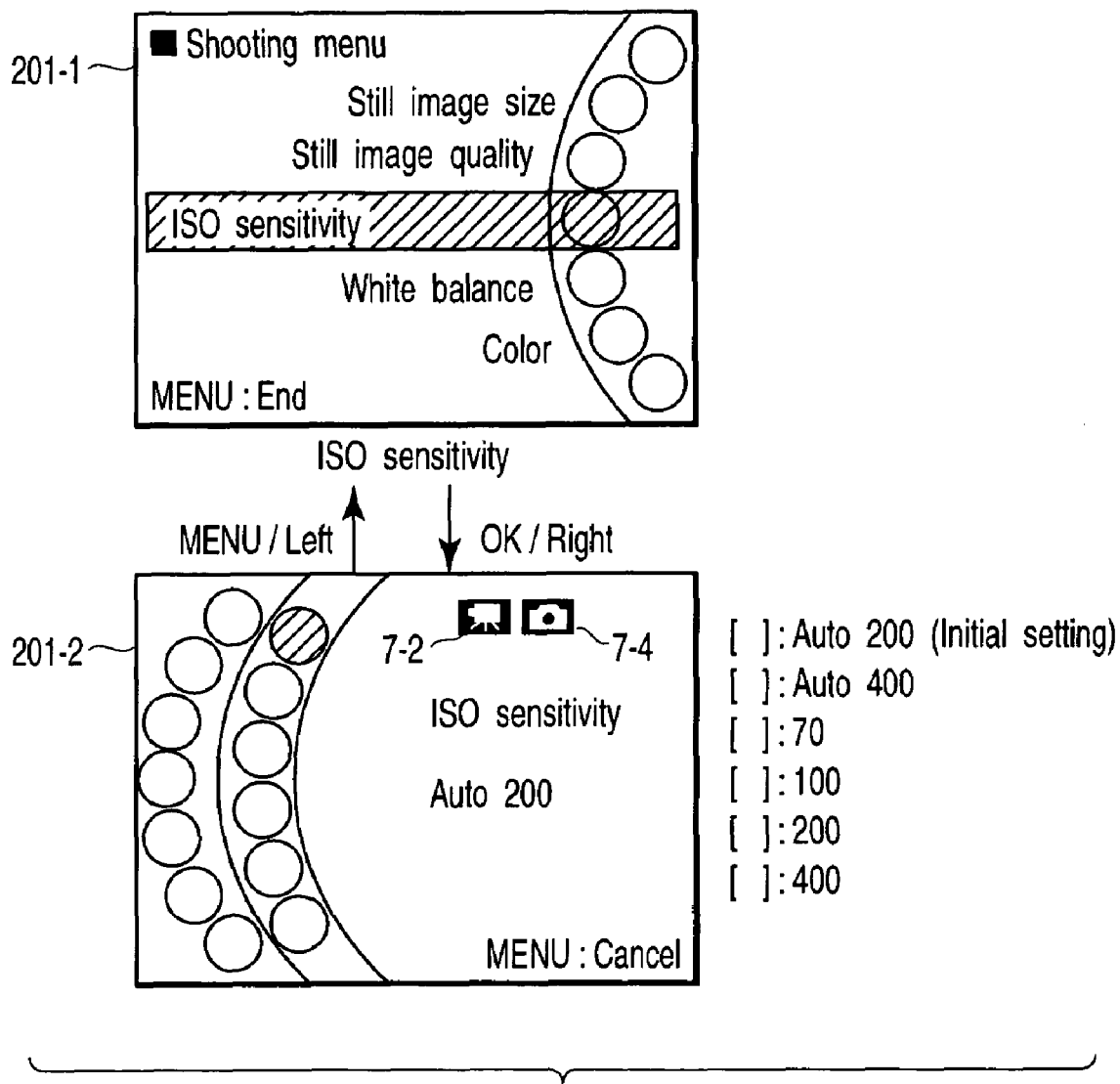
FIG. 11 is an exemplary view showing a guide screen displaying shooting mode icons affected by setup conditions when the shooting condition is set using the shooting menu of the electronic camera apparatus.

In FIG. 11, there is shown a guide screen 201-1 on the liquid crystal monitor 201 when setting shooting sensitivity. When the user rotates the jog dial 213, the title "ISO sensitivity" appears as a sensitivity control item. Here, when the user operates the OK button 214, the screen changes into a guide screen 201-2, that is, a screen for setting detailed sensitivity. As seen from the guide screen 201-2, the user is able to select the desired ISO sensitivity from "auto 200", "auto 400", "70", "100", "200" and "400". The user rotates the jog dial 214, and thereby, the current select state is displayed on the guide screen 201-2. FIG. 11 shows a state that "auto 200" is elected as the ISO sensitivity.

Moreover, if the foregoing sensitivity control is made, the electronic camera apparatus is able to display icons 7-2 and 7-4 to easily inform the user of video shooting or still image shooting. After sensitivity setting is completed, when the user presses the left triangular arrow of the OK button 214, the guide screen is returned to the guide screen 201-1.

Figure 12:
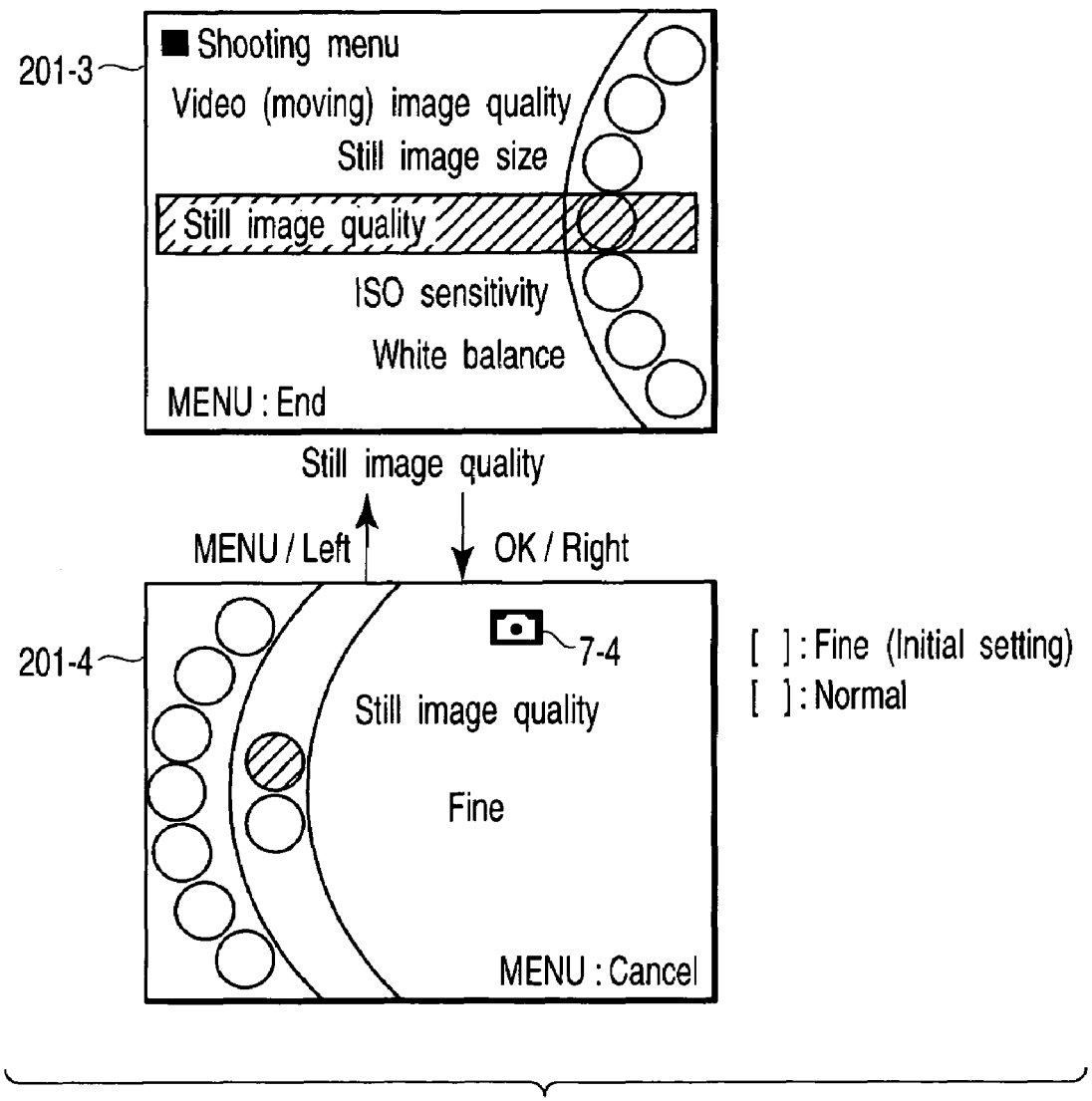
FIG. 12 is a view showing another exemplary guide screen displaying shooting mode icons affected by setup conditions when the shooting condition is set using the shooting menu of the electronic camera apparatus.

FIG. 12 shows a state that still image quality is set. In the electronic camera apparatus, the video shooting quality is previously set to a constant value (e.g., 0.3M (megabit)). However, several settings are possible for still images. In FIG. 12, there is shown a state that image quality "normal" and "fine" are selectable. In this case, the image quality may be set to 3M, 1.2M and 5M.

In the shooting menu indication mode, the user rotates the jog dial 213, and thereby, the title "image quality" appears as an image-quality setting item (see guide screen 201-3). Here, when the user operates the OK button 214, the screen changes into a guide screen 201-4, that is, a screen for setting the quality in detail. In this case, the user rotates the jog dial 213 to select "normal" or "fine". FIG. 12 shows a state that "fine" is selected. The foregoing still image quality setting is completed, and thereafter, when the user presses the left triangular arrow of the OK button 214, the screen is returned to the guide screen 201-3. If the still image quality setting is made, the setting result influences the still image. The user is readily notified of this because the icon 7-4 is displayed.

The foregoing example shows the case of setting still image quality and IOS sensitivity. In this case, the setting result is also given to the user using icons even if other shooting conditions are set. Specifically, it is possible to readily indicate icons that show the setting result giving an influence to which video shooting mode or still image shooting mode, or to both of them.

[Icon Indicates from Which Recording Medium and which Album Video Image is Reproduced from in Playback Mode]

Figure 13:
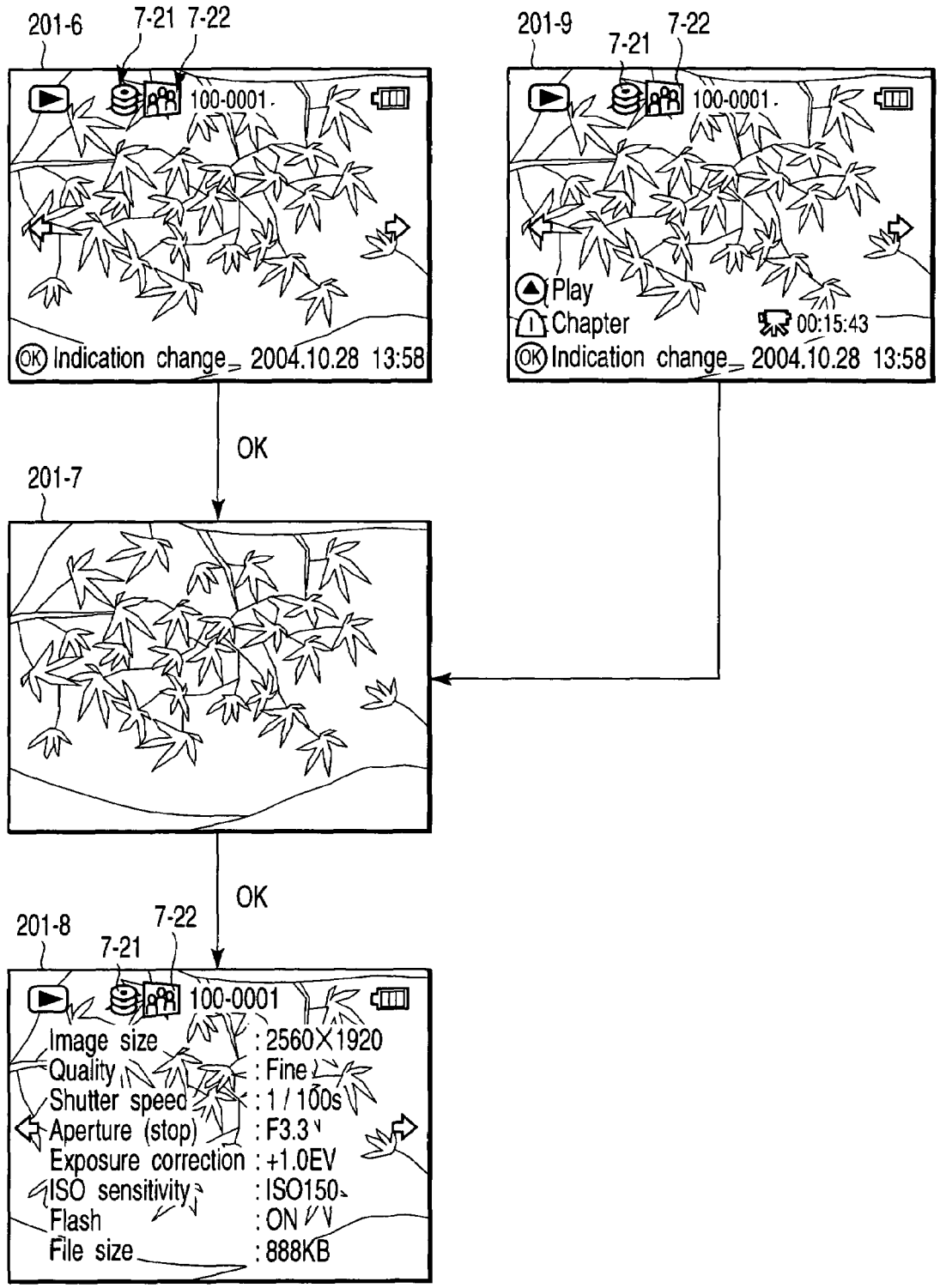
FIG. 13 is a view showing an exemplary guide screen to explain that a reproduced image belongs to which album in a playback (replay or reproduction) mode of the electronic camera apparatus.

FIG. 13 shows a guide screen 201-6 in a still image playback mode. The guide screen 201-6 shows a normal icon indication used for the user guidance. In the guide screen 201-6, icons 7-21 and 7-22, that is, recording media icon of playback image data and album icon stored with playback image data, appear together. These icons appear at the upper portion on the screen although they appeared at the lower left on the screen in the shooting mode. During playback, the user presses the OK button 214, and thereby, an icon non-indication state is given as shown in a guide screen 201-7. Further, the user presses the OK button 214 in the state of the guide screen 201-7, and thereby, detail settings appear as shown in a guide screen 201-8. Further, the user presses the OK button 214 in the state of the guide screen 201-8, and thereby, the screen is returned to the indication state of the guide screen 201-6.

The above explains the state that the screen changes in the still image playback mode. Likewise, the screen changes in the video image playback mode. Specifically, a normal screen is as shown in a guide screen 201-9 in the video image playback mode. In this case also, recording media icon 7-21 of playback image data and album icon 7-22 appear together. The user presses the OK button 214 in the state that the guide screen 201-9 is shown, and thereby, the screen is shifted to the indication state shown in the guide screen 201-7.

[Displaying Zooming Area when Still Image is Zoomed and Reproduced]

The electronic camera apparatus is able to make zoom-in and zoom-out indication in the still image playback mode. A guide screen 201-11 of FIG. 14 shows a normal playback state of making no zoom-in and zoom-out in the still image playback mode. The user operates the zoom bar 212 of FIG. 1B to press upward in a "T-direction," and thereby, a zoomed-in screen is given. In the zoomed-in screen, the user presses the up, down, left or right triangular arrow of the OK button 214, thereby moving the zoom-in position. A guide screen 201-12 shows area including zoomed-in screen area, zoomed-out entire area (small) screen and zoom-in position mark area. In the guide screen 201-12, the zoomed-out entire screen area is appeared at the lower right on the screen while the zoom-in position mark area like a frame appear in zoomed-out entire screen area.

It is possible to recognize where position is zoomed in the entire screen area by confirming the zoom-in position mark area appearing in zoomed-out entire screen area. The zoomed-out entire screen area and zoom-in position mark area disappear when a predetermined time (e.g., three to five seconds) has elapsed after the user has not operated the zoom bar 212 or OK button 214. In this case, a zoomed-in screen is given as shown in a guide screen 201-13. However, when the user starts operating the zoom bar 212 or OK button 214, these zoomed-out entire screen area and zoom-in position mark area appear again.

[Display the Boundary Between Albums, and to Make Consciousness of the Users' Album Feeling, in Thumbnail Indication]

The electronic camera apparatus is able to display thumbnail. Also, it is possible to indicate that which album's thumbnail is displayed using the album icon.

Figure 15:
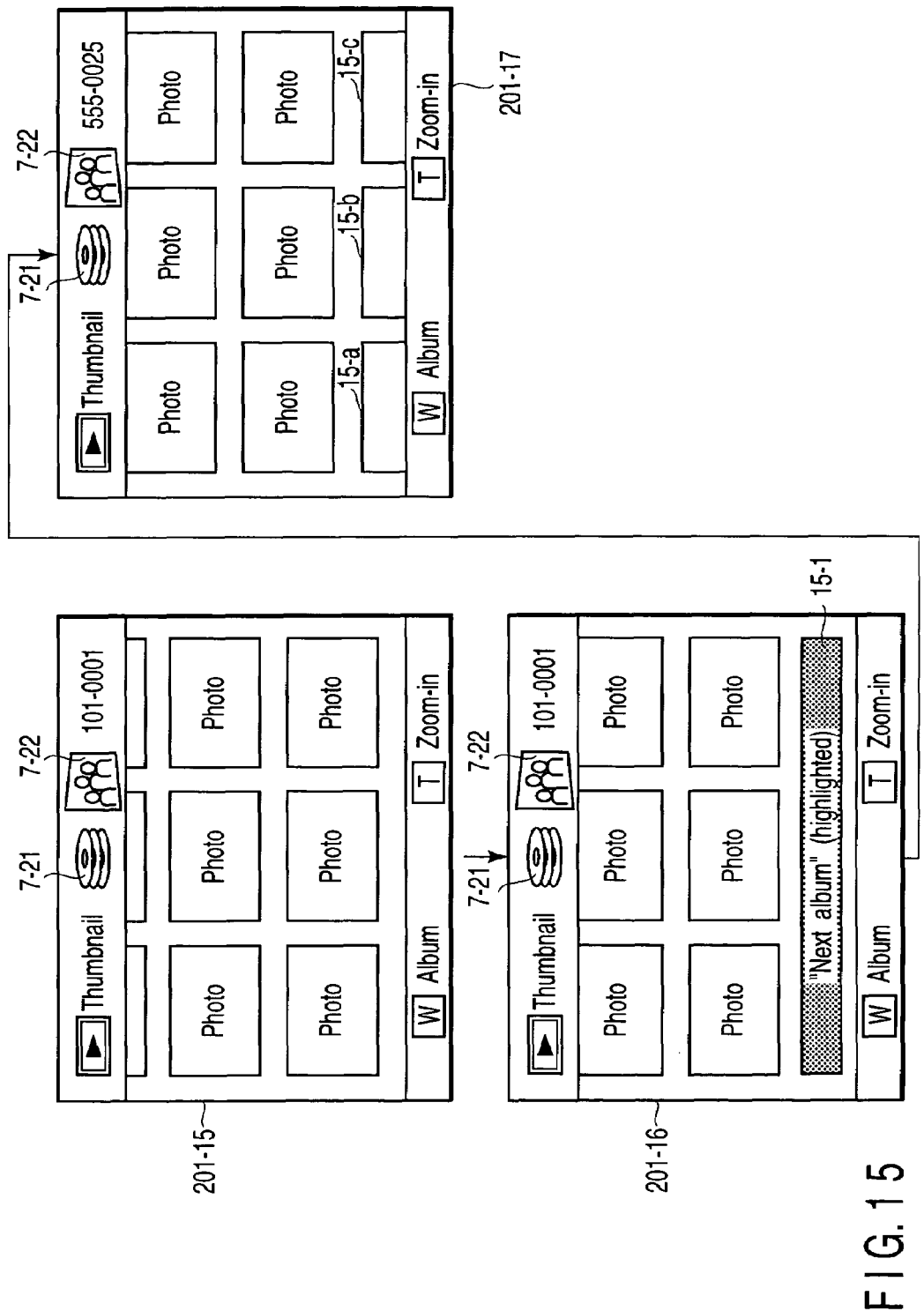
FIG. 15 is a view showing an exemplary guide screen when thumbnail is displayed in the electronic camera apparatus.
Figure 16:
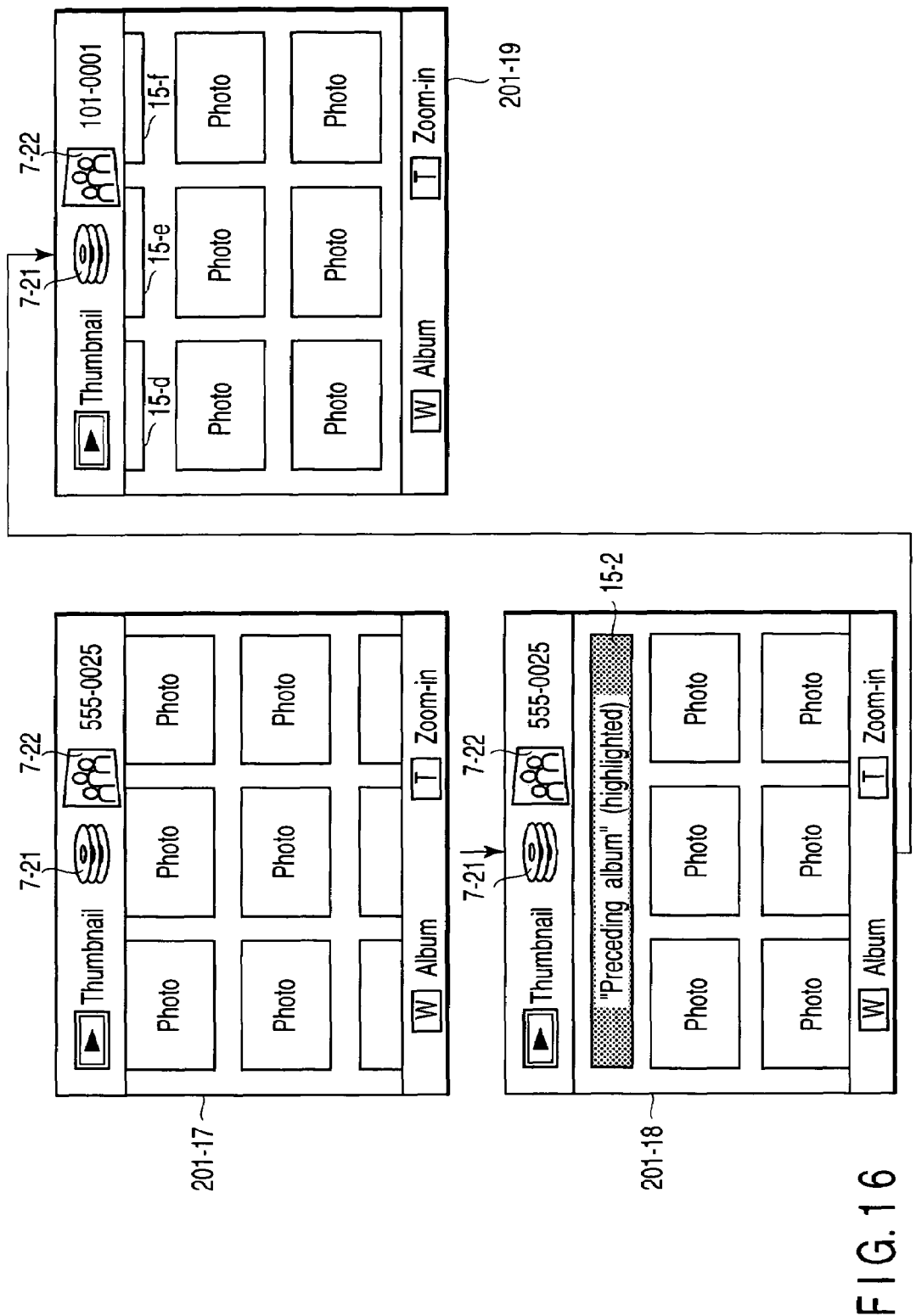
FIG. 16 is a view showing another exemplary guide screen when thumbnail is displayed in the electronic camera apparatus.

FIG. 15 and FIG. 16 each show screens when thumbnails are displayed. In FIG. 15, a guide screen 201-15 shows a state that photo thumbnails of the family album 101 of FIG. 6C stored in the hard disk are displayed. The user operates the zoom bar 212 of FIG. 1B downward in the "W-direction," and thereby, an album is selectable. Moreover, the user operates the zoom bar 212 to the W-direction, and thereby, the photo is displayed in a state of being zoomed in. In a normal state, six photos are displayable on the liquid crystal monitor 201. The user rotates the jog dial 213 of FIG. 1B, and thereby, photos are scrolled in the thumbnail arrangement while six photos are displayed. The user rotates the jog dial 213 to the left direction in the guide screen 201-15 of FIG. 15, and thereby, images (photos) are upwardly scrolled, and thereafter, a guide screen 201-16 is given. The guide screen 201-16 shows that the last photo of the family album 101 is displayed. In addition, the guide screen 201-16 shows that the next album exists if scrolling is further advanced. In other words, a mark 15-1 appears in order to inform the user of the existence of another album. As seen from a guide screen 201-17, photos of the next album 555 appear. As depicted in the guide screen 201-17, six thumbnail photos are displayed so that a margin is given in a display area in this embodiment. It is designed such that the next photos 15-a, 15-b and 15-c partially appear at the lower side of the display area. Therefore, the user is able to readily confirm that another thumbnail exists, and in addition, thumbnail indication corresponding to operation imaging is performed.

FIG. 16 shows a state that the jog dial 213 of FIG. 1B is rotated to the right direction to downwardly scroll images in the state of the guide screen 201-17 of FIG. 15. When the image is scrolled, and then, returned to the leading photo of the family album 555, the screen changes from the state of the guide screen 201-17 to a guide screen 201-18. In this case, a mark 15-2 appears at the upper side on the guide screen 201-18. The user can recognize that the preceding album will be appeared in next stage. By doing so, the user can see thumbnails ad the album they are in. When scrolling is further advanced, thumbnail of the album 101 are displayed shown as shown in a guide screen 201-19. In this case part of photos 15-d, 15-e and 15-f in the next line are displayed in this display area. The foregoing partial display gives the user recognition that further photos are stored in this album. Therefore, this serves to prevent the user from missing thumbnails.

[Chapter Select Display is Made in the Form of Film in Video Playback Mode]

In the electronic camera apparatus, when chapter select is made in the video playback mode, several continuous images forming the chapter are simultaneously displayed. In the guide screen 201-9 prepared for the video playback mode shown in FIG. 17, the user operates the zoom bar 212 to the T-direction, and thereby, a guide screen 201-21 is given. According to the guide screen 201-21, a message such as chapter No.: 06 and playback time: 52 minutes 27 seconds appears. If the user desires to change this chapter into the next chapter, the user rotates the jog dial 213 to the right, and thereby, a guide screen 201-22 is given. Specifically, according to the guide screen 201-22, a message such as chapter No.: 07 and playback time: 30 minutes 00 seconds appears. If the user presses the OK button, the video playback of the chapter is started. When the user rotates the jog dial 213 to the left in the guide screen 201-22, the screen is returned to the guide screen 201-21.

In the foregoing initial screen when chapter select is made, several images of the selected chapter are displayed in the form of a film. In other words, part of the film including several frames is displayed. The reason why several images are displayed in the form of a film is as follows. In general, the form of a film serves to enable the user to think of a movie. Namely, this serves to give an impression that the current playback mode is the video playback mode. Moreover, the reason why several frames are displayed is as follows. For example, if the user sees one frame only, there is a possibility that the user will not understand the content of the chapter. In view of the foregoing circumstances, several frames are used so that the user can easily understand the content.

[Protection with Respect to Album, Protection with Respect to Image Files in Album]

[Preceding Album is Displayed]

Figure 18:
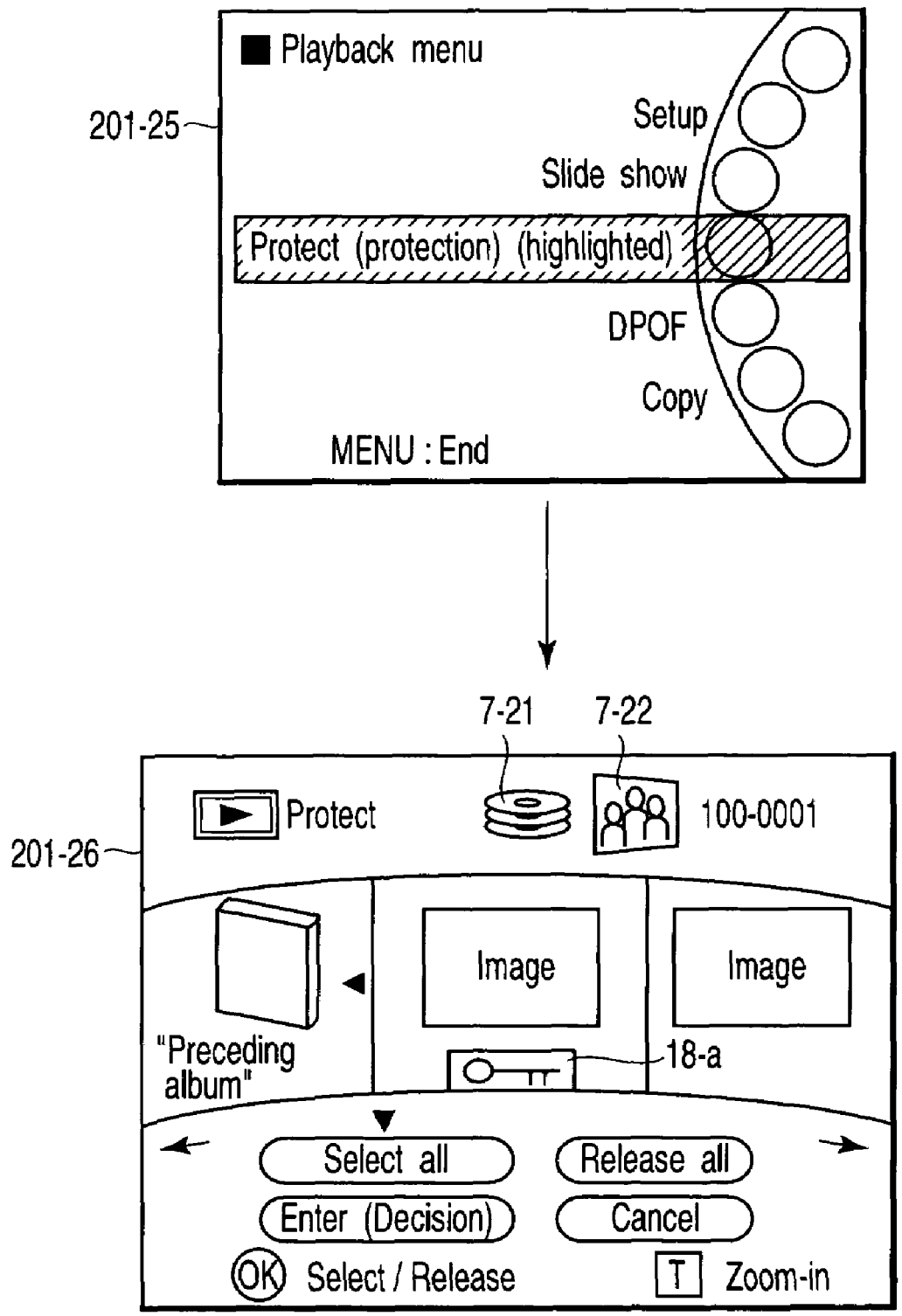
FIG. 18 is a view to explain an exemplary guide screen when protection processing is made in the electronic camera apparatus.

In a playback menu, the jog dial 213 is rotated to select a protection item. FIG. 18 shows a guide screen 201-25 when the protection item is selected. The user presses the OK button 214 of FIG. 1B, and thereby, a guide screen 201-26 is displayed. On the display screen, images of the family album 100 shown by the icon 7-22 appear. If protection is given to the currently displayed image, the user presses the OK button, and thereby, protection is set. In this case, a key mark 18-a appears at the lower side of the image. If the user desires to release the foregoing protection, the user presses the OK button again, and thereby, protection is released. If the user gives protection to another image of the album, the user rotates the jog dial 213, and thereby, the next image is displayed. Thereafter, if a desired image to be protected appears, the user presses the OK button, and thereby, protection is given to the desired image.

If the user desires to protection the whole of the album storing the currently displayed image, the user operates the OK button cursor to move a cursor in the downward triangular arrow direction. Then, the user moves the cursor on an item "select all", and thereafter, presses the OK button 214, and thereby, protection is given to the whole of the album. If the user desires to release the protection given to the whole of the album, the user makes the following operation. Specifically, the user rotates the jog dial 213 in a state that the cursor is positioned on an item "select all", and thereby, the cursor is moved. Then, the user moves the cursor on an item "release all", and thereafter, presses the OK button, and thereby, protection given to the selected album is released.

The user rotates the jog dial 213, and thereby, the cursor is moved on an item "decision". In this state, if the user presses the OK button, protection or protection release set so far is entered, and thereafter, the screen is returned to the playback menu screen.

If the user desires to select another album, the user operates the OK button 214 in the left or right triangular arrow direction, and thereby, access to another album is made. The accessed album is recognizable by confirming the icon 7-22.

The user can readily recognize the boundary of the album via the foregoing operation. Specifically, the thumbnail of the image file stored in the accessed album is displayed while scrolling the thumbnail indication (display). When scrolling advances and access to the next album is made, album icons of the next album are displayed in the thumbnail arrangement. In the guide screen 201-26 of FIG. 18, an album icon is displayed together with a message of "preceding album".

According to the foregoing operation, protection is set while seeing image files stored in the album. Moreover, it is possible to make protection setting and release for each album.

Figure 19:
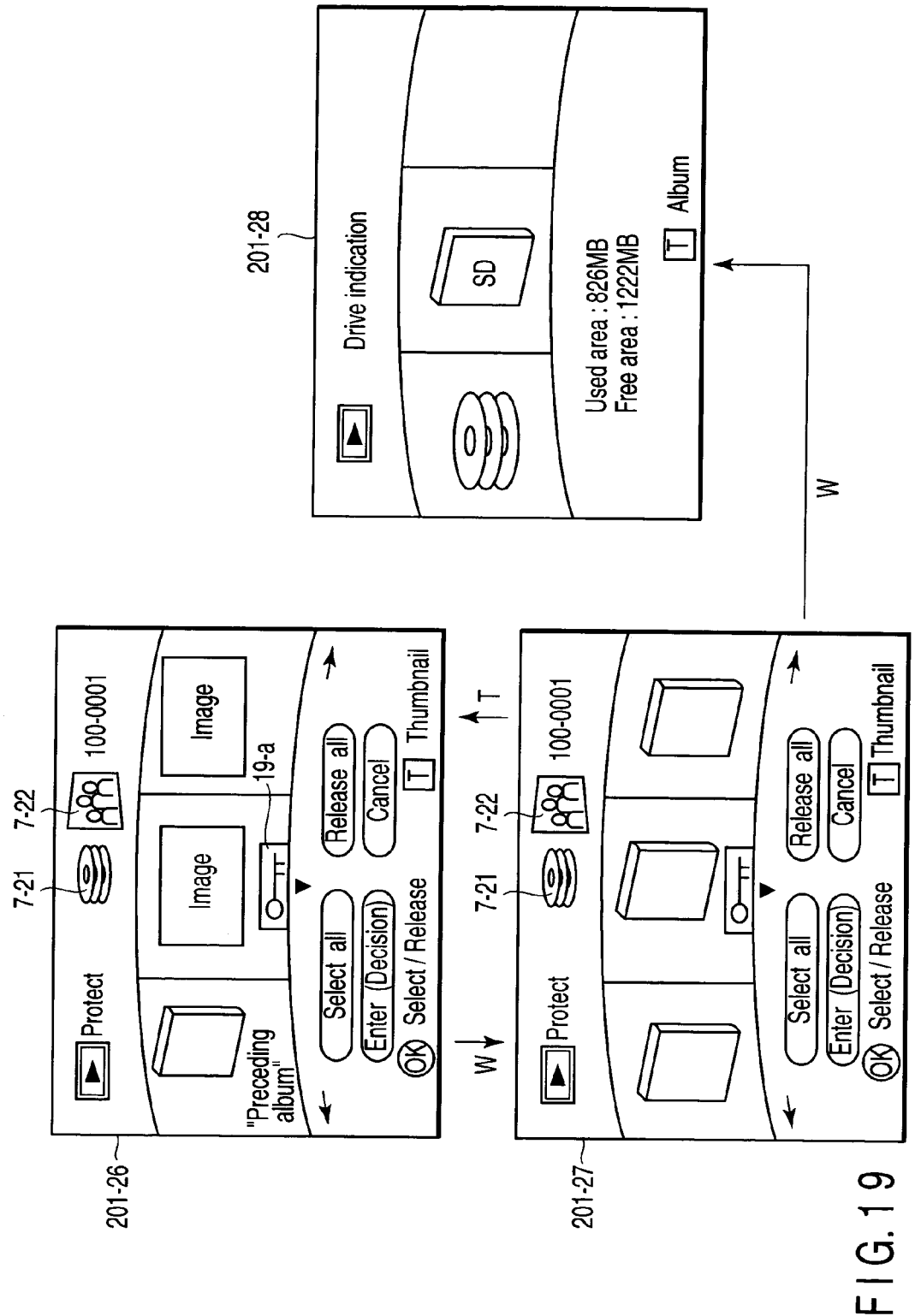
FIG. 19 is a view to explain another exemplary guide screen when protection processing is made in the electronic camera apparatus.

The user presses the zoom bar 212 to the W side in the guide screen 201-26 (also shown in FIG. 19) shown in FIG. 18, and thereby, a change to a guide screen 201-27 of FIG. 19 is made. In the guide screen 201-27, three albums are displayed, and the center album of them is set as an access target. Icons of the center album, that is, recording media icon 7-21 and album icon 7-22 are simultaneously displayed. If protection is given to the album, a key mark 19-a is displayed. The user presses the zoom bar 212 in the T-direction of the guide screen 201-26 (also shown in FIG. 19) shown in FIG. 18, and thereby, a change to the guide screen 201-26 is made. Namely, thumbnail (image display) of the enter album is obtained.

The user presses the downward triangular arrow of the OK button 214, and thereby, the cursor moves to an item "select all". Further, the user rotates the jog dial 213, and thereby, the cursor is moved to items "release all", "enter" and "cancel".

The user selects the item "select all" and presses the OK button 214, and thereby, protection of the center album, that is, family album 100 is released. In addition, the key mark 19-a disappears.

If the user desires to give protection to another album, the user operates the jog dial on the guide screen 201-27 (i.e., state that item select by cursor is not made), and thereby, the album icon is scrolled. Therefore, the preceding or backside album is scrolled to the center position.

The user presses the zoom bar to the W side in the guide screen 201-27, and thereby, a guide screen 201-28 for selecting the drive is given. A hard disk or SD memory (semiconductor memory) icon is displayed. Thus, an arbitrary recording medium is selectable. In order to select the recording medium, the user rotates the jog dial 214 to position a desired recording medium icon to the center on the screen, and thereby, the recording medium is selectable. The user presses the zoom bar 212 in the T-direction, and thereby, the screen is returned to the guide screen 201-27, that is, a state of displaying the album recorded in the selected recording medium.

As described above, the electronic camera apparatus is able to give protection for each album, and to give protection for each image file stored in each album. Therefore, there exists an album having protected image files and image files to which protection is not given. The album described above is called a protection-mixed album. Moreover, the album to which protection is not given is called a non-protection album. Three kinds of albums exist with respect to the foregoing protect. However, the electronic camera apparatus is designed to readily distinguish the kind of album when the album is displayed.

Figure 20:
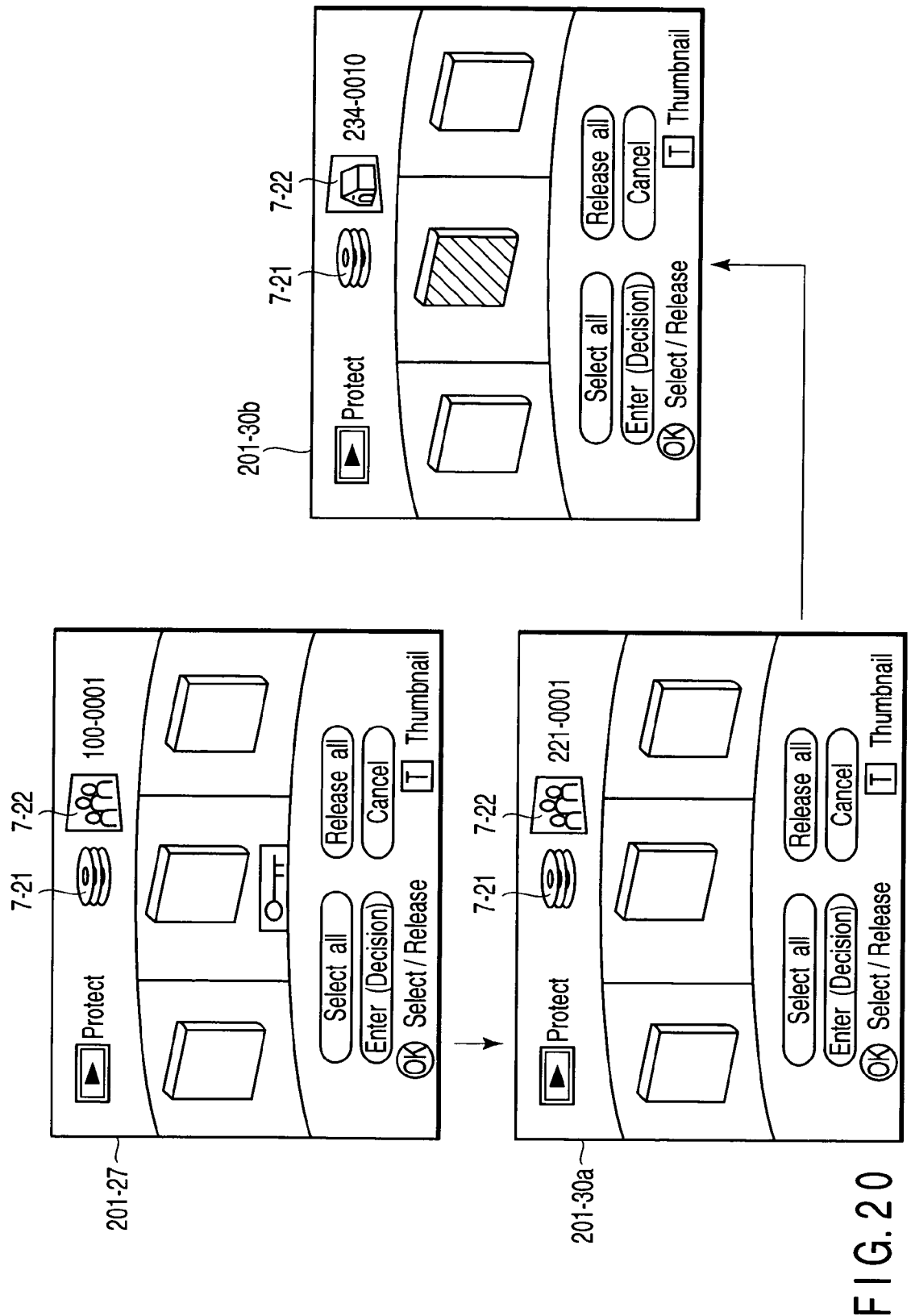
FIG. 20 is a view to explain another exemplary guide screen when protection processing is made in the electronic camera apparatus.

In FIG. 20, there is shown the guide screen 201-27 showing a state that protection is given to the family album. The key mark is shown below the album icon. When the user further rotates the jog dial, a guide screen 201-30a is given. The guide screen 201-30a shows a state that an album relevant to birthdays is arranged on the center on the screen. According to the screen, protection is not given to the album relevant to birthdays. When the user further rotates the jog dial in the foregoing guide screen, a guide screen 201-30b is given. The guide screen 201-30b shows a state that an album relevant to pets is arranged on the center on the screen. In this case, the center album differs from other albums in color, or is displayed in a state of being colored gray. This state implies that the album includes protected image files and image files to which protection is not given. In other words, this state implies that the album is a protection-mixed album.

[Select Specified Album or All Albums in Slide Show]

Figure 21:
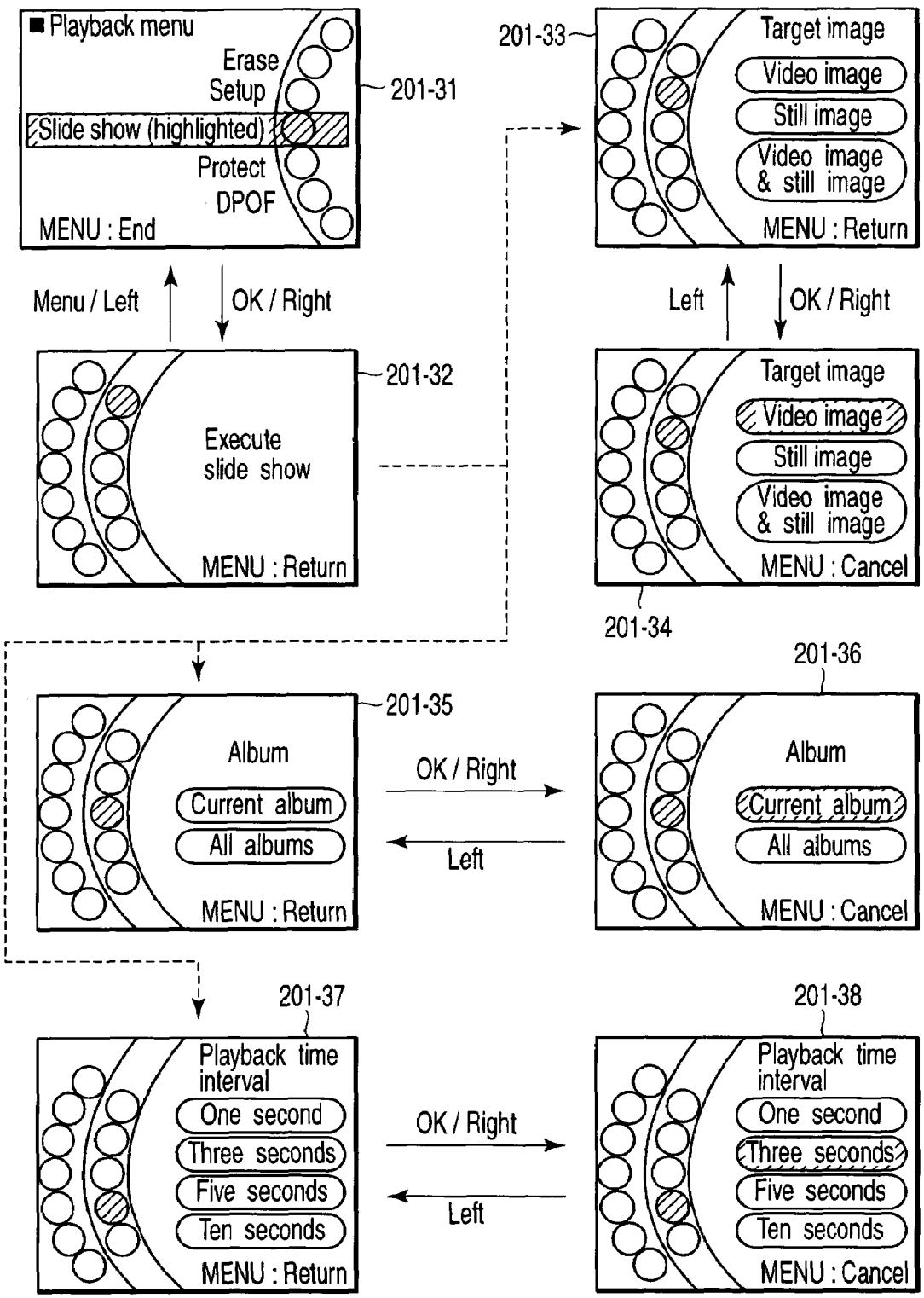
FIG. 21 is a view to explain an exemplary guide screen when slide show is carried out in the electronic camera apparatus.

As seen from a guide screen 201-31 of FIG. 21, the electronic camera apparatus is able to select an item "slide show" in the playback menu. When the jog dial is rotated to position the cursor to the item "slide show", the user presses the right arrow of the OK button 214 of FIG. 1B. By doing so, a standby guide screen 201-32 for executing a slide show is given. Here, the user rotates the jog dial 213 without pressing the OK button 214, and thereby, the screen is shifted to a guide screen 201-33, that is, a screen for selecting a slide show target image. When the guide screen 201-33 is given, the user presses the right arrow of the OK button 214, and a guide screen 201-34 is given. In guide screen 201-34, the cursor is positioned on the target image item, that is, "video". In this state, the user rotates the jog dial 213, and thereby, the cursor is successively moved to items "still image", "video & still image". The user selects a desired item, and thereafter, presses the left arrow of the OK button 214, and thereby, the screen is returned to the guide screen 201-33.

When the user further rotates the jog dial 213 in the guide screen 201-33, a guide screen 201-35 is given. In the guide screen 201-35, an album executing slide show is selectable. Here, the user presses the right arrow of the OK button 214, and thereby, a guide screen 201-36 is given, and the cursor specifies an item "current album". The user further rotates the jog dial 213, and thereby, the cursor is moved to an item "all albums". The user moves the cursor to a desired item, and thereafter, presses the left arrow of the OK button 214, and thereby, the screen is returned to the guide screen 201-35.

In the guide screen 201-35, the user rotates the jog dial 213, and thereby, a guide screen 201-37 appears. The guide screen 201-37 is a screen for setting the time interval of each screen in a slide show. Here, the user presses the right arrow of the OK button 214, and thereby, a guide screen 201-38 is given in a state that the cursor specifies an item "one second". The user rotates the jog dial, and thereby, the cursor is successively moved to items "three seconds", "five seconds," "ten seconds" and "one second". The user selects a desired time interval, and thereafter, presses the left arrow of the OK button 214, and thereby, the screen is returned to the guide screen 201-37. Further, the user presses the left arrow of the OK button 214, and thereby, the screen is returned successively to guide screens 201-35, 201-333, and 201-32.

When the guide screen 201-33 is given, the user presses the right arrow of the OK button 214, and thereby, the slide show starts. During the slide show, the current playback recording medium icon, album icon, and image file number are displayed.

[Set Existing Album and New Album as Copy Destination in Copy Function]

Figure 22:
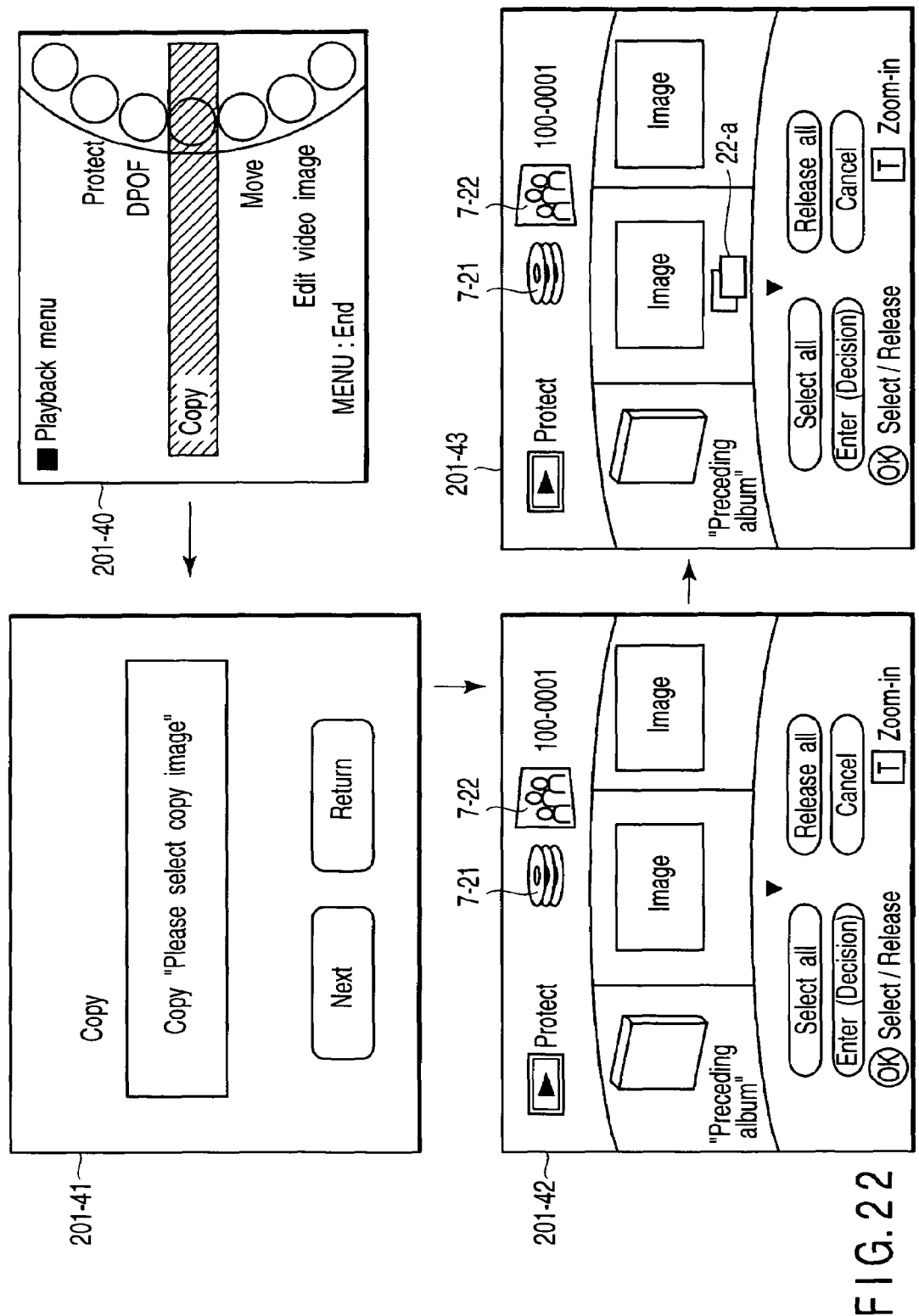
FIG. 22 is a view to explain an exemplary guide screen when copy is made in the electronic camera apparatus.

As seen from a guide screen 201-40 of FIG. 22, the user rotates the jog dial 213 in the playback menu, and thereby, an item "copy" is displayed on the cursor position. Here, when the user presses the right arrow of the OK button 214, a guide screen 201-41 is given, and then, a message of "Please select copy image" appears. The user rotates the jog dial to select an item "next", and thereby, a guide screen 201-42 is given. The guide screen 201-42 is a screen for selecting a copy image, and an image of the currently developing album appears on the center of the screen. Here, the user rotates the jog dial 213 to display a desired image on the center position. If an image to be copied is positioned on the center, the user presses the downward arrow of the OK button, and thereby, the cursor specifies an item "enter (decision)". As seen from a guide screen 201-43, a mark 22-a indicative of the copy target appears below the selected image. Here, the user presses the downward arrow of the OK button 214, and thereby, the cursor specifies the item "enter".

Figure 23:
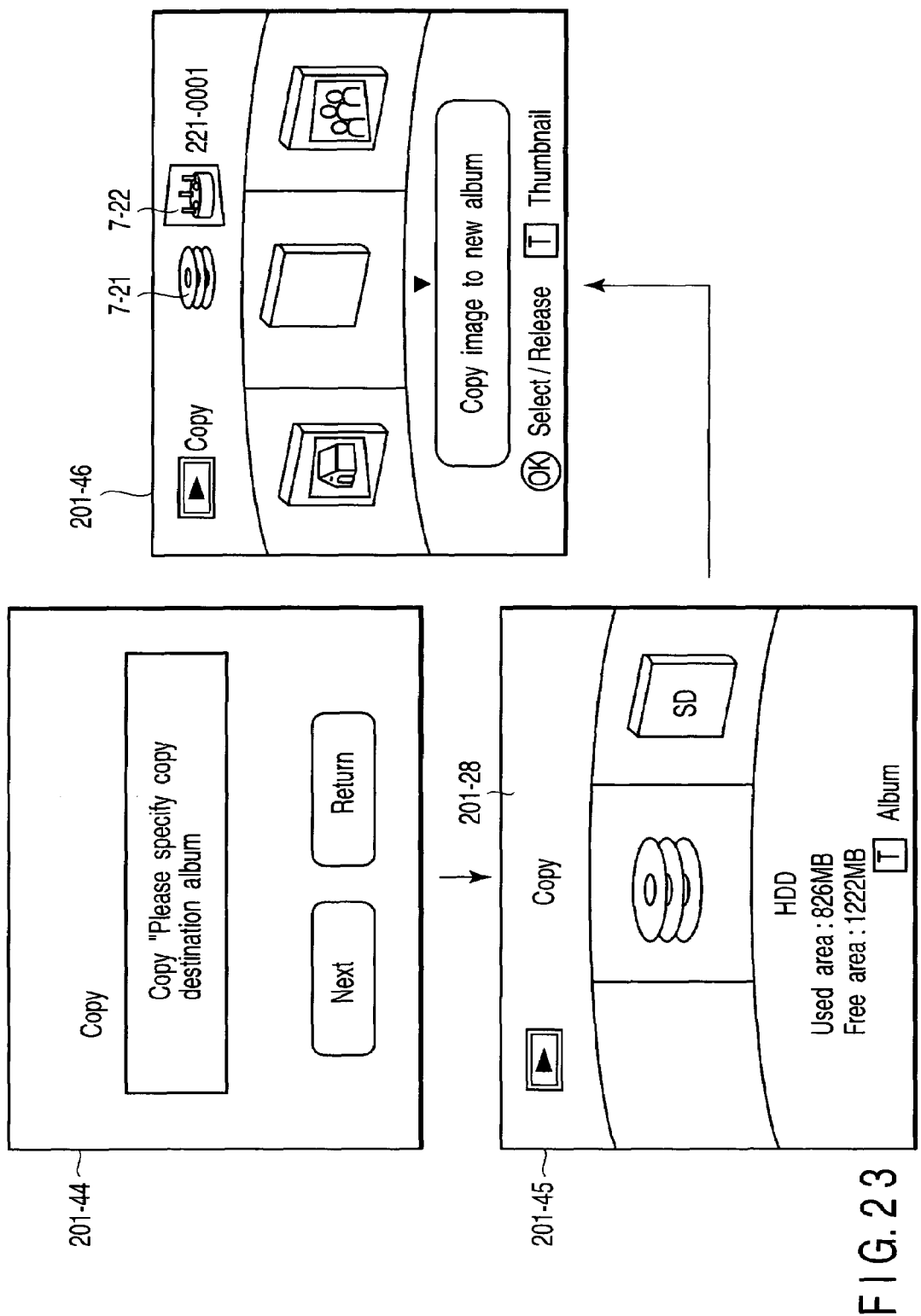
FIG. 23 is a view to explain another exemplary guide screen when copy is made in the electronic camera apparatus.

Thereafter, as seen from a guide screen 201-44 shown in FIG. 23, a message, "Please specify copy destination album" appears. In the guide screen 201-44, the user rotates the jog dial to select the item "next", and thereby, a guide screen 201-45 is given. The guide screen 201-45 is a screen for selecting a recording medium as the copy destination. In the guide screen 201-45, a hard disk icon and SD memory (semiconductor memory) icon appear. The user rotates the jog dial 213 to position a desired recording medium on the center, and thereby, the desired recording medium is selected. The guide screen 201-45 of FIG. 23 shows a state that the hard disk is selected. Here, when the user presses the OK button 214, album icons stored in the hard disk are displayed. A guide screen 201-46 shows a state that several album icons are displayed.

The user moves a desired icon on the center of the screen, and thereafter, presses the OK button 214, and thereby, the selected image is copied to the album corresponding to the icon.

If the user desires to create a new album in the guide screen 201-46, and to copy the image to the newly created album, the following operation may be made. Specifically, the user presses the downward arrow of the OK button to move the cursor to an item "copy to new album". Then, the user rotates the jog dial 213, and thereby, several icons shown in FIG. 3 are successively displayed on the album icon indication window. If a desired album icon is displayed on the center of the screen, the user presses the OK button, and thereby, a new album is set while the selected image is copied to the new album. Thereafter, a message, "copying" appears although it is not illustrated, and then, when copy ends, a message, "copy end" appears. The screen is returned to the playback menu screen after several seconds (e.g., three seconds).

The electronic camera apparatus has a move function, as seen from the guide screen 201-40 of FIG. 22. The operation is similar to the copy operation; therefore, a detailed explanation is omitted.

Figure 24:
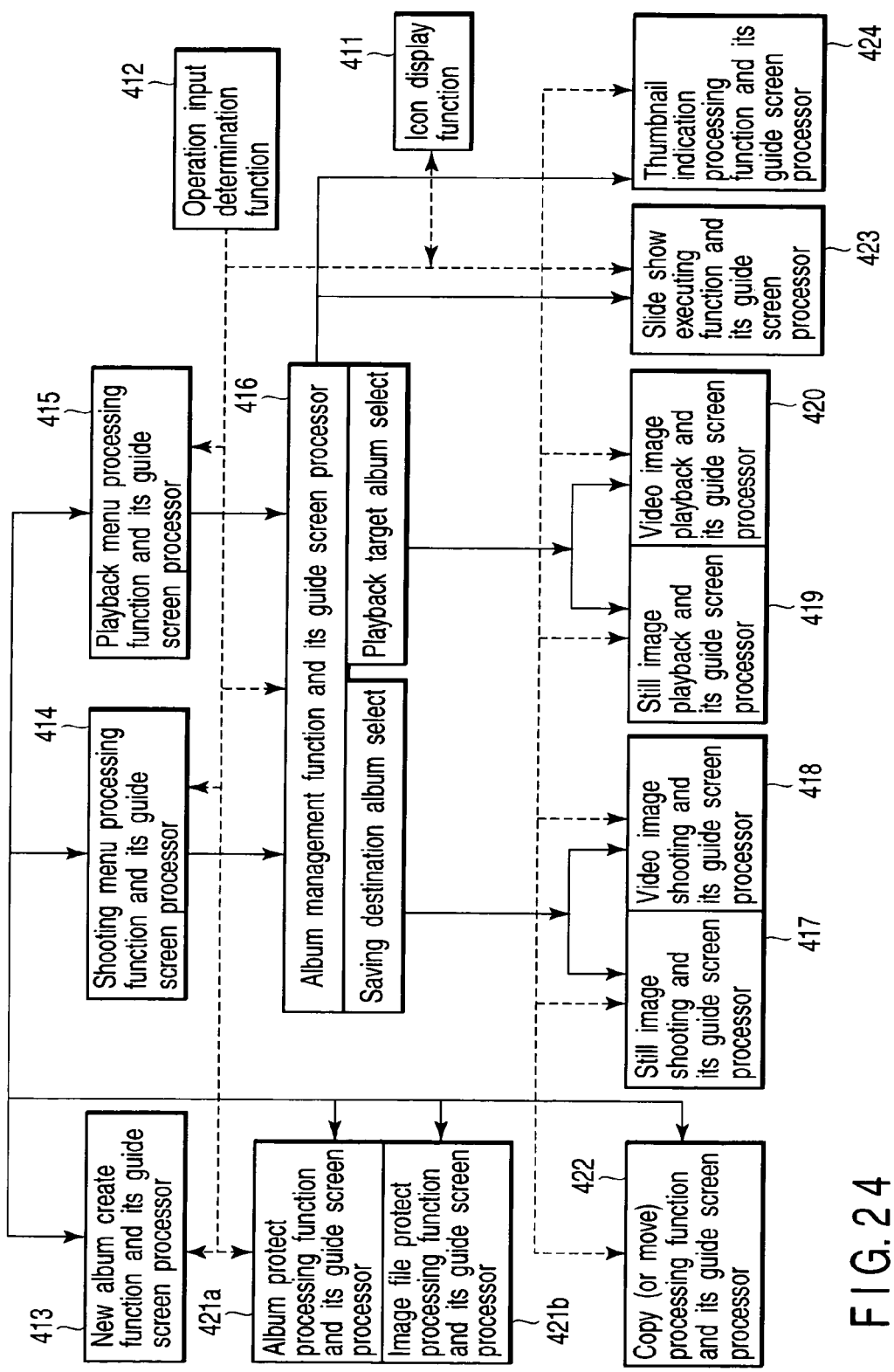
FIG. 24 is a functional block diagram to explain the features of the electronic camera apparatus according to one embodiment of the invention.

FIG. 24 is a functional block diagram to explain the features of the electronic camera apparatus according to one embodiment of the invention.

The blocks are mainly comprised of memory controller 15, memory 43, image processor 61 and liquid crystal monitor 201, which are shown in FIG. 2. Each block includes a function of entering an icon selected from an icon display function section 411, processing the icon in accordance with an operation input, and outputting it to the display. The guide screen of each block changes based on operation input information determined in an operation input determination function section 412. The change of the guide screen is as described above.

The functional blocks are largely classified into the following sections. For example, a new album creation function and its guide screen processor 413, a shooting menu processing function and its guide screen processor 414, and a playback menu processing function and its guide screen processor 415 are given. Further, an album management function and its guide screen processor 416 is given, and includes the following functions. One is a function of selecting a saving album destination of the shot image file. Another is a function of selecting a playback target album when reproducing the image file. Further, still image shooting and its guide screen processor 417, and video image shooting and its guide screen processor 418 are given as a block operating in the shooting mode. Further, still image playback and its guide screen processor 419, and video image playback and its guide screen processor 420 are given as a block operating in the playback mode.

The following sections are given as a block for executing processings relevant to an album. An album protection processing function and its guide screen processor 421a, and an image file protection processing function and its guide screen processor 421b are given. Further, a copy (or move) processing function and its guide screen processor 422, a slide show executing function and its guide screen processor 423, and a thumbnail indication processing function and its guide screen processor 424 are given.

The electronic camera apparatus of the present invention has features described in the foregoing drawings. In addition, the electronic camera apparatus has means for realizing the following functional features. Specifically, when pause is executed in video shooting, the apparatus has a function of displaying the pause icon on part of the display screen (see FIG. 9). When the user starts adjustment to adjust the shooting conditions, the adjust value and key to be operated are displayed as a pair (see FIG. 10). When the user selects an adjustment item in the shooting menu, and adjusts data corresponding to the item, a shooting mode (still or video image shooting) mark reflecting the adjustment result appears on the monitor screen (see FIG. 11).

Moreover, when the zoom-in or zoom-out operation is made in still image playback, a sub-screen showing the entire screen appears in the zoomed-in screen (see FIG. 14). In the sub-screen, the frame (zoom-in position mark) showing the zoomed-in portion appears. A predetermined time elapses, and thereafter, the sub-screen and the frame disappear.

Figure 17:
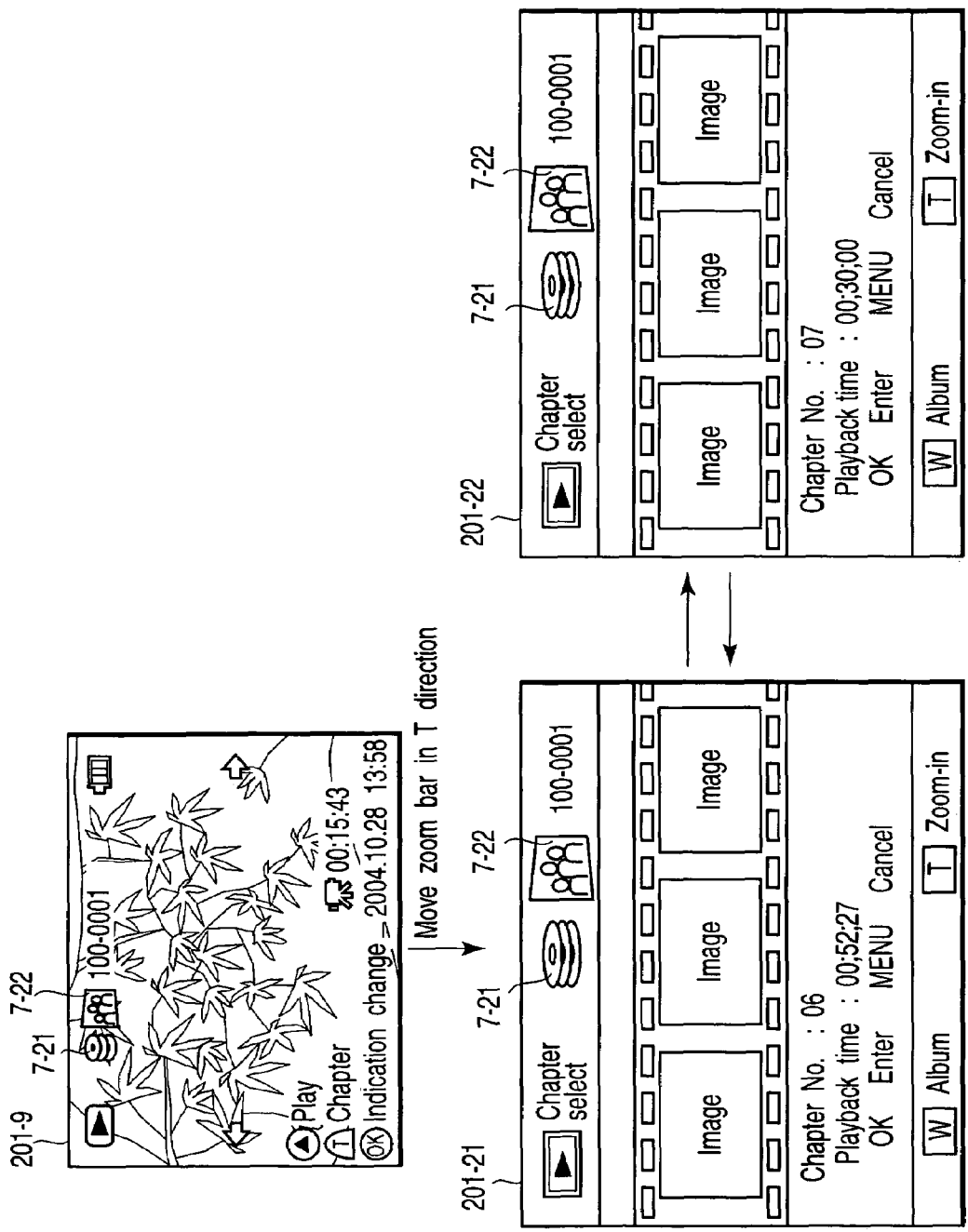
FIG. 17 is a view to explain the features of an exemplary display mode when chapter display is made in the electronic camera apparatus.

In video playback, the chapter select guide screen is given (FIG. 17). When a chapter is specified, several frames included in the chapter are displayed in the form of a film; therefore, this serves to give an impression that the current mode is video mode.

Even if a large-capacity recording media is used, the foregoing means are given; therefore, it is convenient for the user to classify and properly arrange the image file, and to manage the album. The foregoing album identifier information is effective in enabling the user to accurately and readily operate the camera apparatus.

The present invention is not limited to the foregoing embodiment. In this case, constituent components are modified within the scope without diverging from the subject matter of the invention in the working step. Several constituent components disclosed in the foregoing embodiment are properly combined, and thereby, various inventions may be formed. For example, some components may be deleted from the whole constituent components disclosed in the embodiment. Moreover, constituent components disclosed in different embodiment may be properly combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic camera apparatus adapted to operate in a shooting mode and a playback mode, comprising:
  a creating section configured to create a plurality of albums used for classifying and arranging an image file;
  a main body of the electronic camera apparatus;
  a recess configured to able to receive and open a display section;
  a jog dial on the main body, the jog dial being adjacent to the display section;
  the display section configured to display a shooting menu and a part of an arc image of the jog dial when the display section is opened, and various menu items of the shooting menu being scrolled on the display section according to a rotation of the jog dial, the display section being configured to display album identifier information corresponding to an album selection in the various menu items;
  a capturing section configured to capture an image; and
  a recording section configured to record the image as said image file to a storage, the image file being associated with at least one designated album through the displayed album identifier information when the image file is recorded.

2. The apparatus according to claim 1, wherein the display section displays album identifier information corresponding to each of the plurality of albums.

3. The apparatus according to claim 1, wherein the album identifier information comprises a plurality of icons previously stored in the display section, the plurality of icons includes an icon to create a new album when the icon is selected.

4. The apparatus according to claim 3, wherein the display section displays a guide screen adapted to determine whether or not a file number is reset when the new album is created.

5. The apparatus according to claim 1, further comprising:
  a selecting section configured to select the album identifier information associated with one of the plurality of albums displayed in a shooting menu to receive the image file, where the display section displays the album identifier information stored with the image file on part of a screen.

6. The apparatus according to claim 1, further comprising:
  a specifying section configured to specify album identifier information corresponding to one of the plurality of albums for playback of the image file stored as part of the one of the plurality of albums.

7. The apparatus according to claim 1, wherein
  the display section displays image files stored in a first album of the plurality of albums in a form of photo thumbnails in a playback menu, and displays a mark of a boundary of the album when scrolling the photo thumbnails and moving to a photo thumbnail of a second album of the plurality of albums.

8. The apparatus according to claim 1, wherein the display section displays image files stored in an album of the plurality of albums in a form of photo thumbnails in a playback menu, and displays a mark of a boundary of the album when scrolling photo thumbnails and moving to a thumbnail of a next album.

9. The apparatus according to claim 1, further comprising:
  album protection setting section configured to set protection with respect to a selected album of the plurality of albums.

10. The apparatus according to claim 9, wherein the means for displaying is adapted to set a display color of the protected album to a color different from non-protected albums of the plurality of albums.

11. The apparatus according to claim 9, further comprising:
  image file protection setting section configured to set protection with respect to a selected image file of a plurality of image files stored in the selected album.

12. The apparatus according to claim 11, wherein the display section is adapted to set a display color of the protected image file to a color different from non-protected image files of the plurality of image files.

13. The apparatus according to claim 1, further comprising:
  a slide show performance section configured to execute slide show of image files stored in an album; and
  a guide screen display section configured to display a guide screen for selecting whether slide show of all images files stored in several albums or slide show of an image file of a specific selected album is executed, as a menu before executing the slide show.

14. The apparatus according to claim 1, further comprising:
  a first processing block configured to execute copy or move of an image file stored of an album, and menu display means including:
  a second processing block configured to display images of the image file to select the copy or move image file;
  a third processing block configured to display set several pieces of album identifier information to select a copy or move destination album when the copy or move image file is selected; and
  a fourth processing block configured to copy or move the copy or move image file to an album corresponding to the album identifier information selected from displayed several pieces of album identifier information.

15. An operation guide method for an electronic camera apparatus comprising:
  displaying a shooting menu and a part of an arc image of a jog dial when a display section is opened, and various menus items of the shooting menu being scrolled on the display section according to a rotation of the jog dial, and displaying the album identifier information of a destination album storing an image file on part of a guide screen, the destination album being one of the plurality of albums; and
  determining the destination album for the image file in a shooting menu for storage of the image file, and the image file being associated with the at least one designated album through the displayed album identifier information when the image file being recorded.

16. An operation guide method according to claim 15, wherein prior to determining the destination album, the method further comprises:
  creating an album when a portion of the album identifier information is selected; and
  displaying album identifier information associated with the newly created album.

17. An electronic camera apparatus adapted to operate in a shooting mode and a playback mode, comprising:
- means for creating a plurality of albums used for classifying and arranging an image file;
- a main body of the electronic camera apparatus;
- a recess configured to able to receive and open a display means;
- a jog dial on the main body, the jog dial being adjacent to the display section;
- the display means for displaying a shooting menu and a part of an arc image of the jog dial when the display section is opened, and various menu items of the shooting menu being scrolled on the display section according to a rotation of the jog dial, and for displaying album identifier information corresponding to an album selection in the various menu items;
- means for capturing an image; and
- means for recording the image as the image file to a storage, the image file being associated with a designated album through the displayed album identifier information when the image file is recorded.

18. The apparatus according to claim 17, wherein the means for displaying displays a guide screen adapted to determine whether or not a file number is reset when the new album is created.

19. The apparatus according to claim 17, further comprising:
- means for selecting the album identifier information associated with one of the plurality of albums displayed in a shooting menu to receive the image file, where the means for displaying displays the album identifier information stored with the image file on part of a screen.

20. The apparatus according to claim 17, wherein the means for displaying displays image files stored in a first album of the plurality of albums in a form of photo thumbnails in a playback menu, and displays a mark of a boundary of the first album when scrolling the photo thumbnails and moving to a photo thumbnail of a second album of the plurality of albums.

* * * * *